US012720630B2

(12) United States Patent
Fujishiro et al.

(10) Patent No.: US 12,720,630 B2
(45) Date of Patent: Aug. 25, 2026

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 386 days.

(21) Appl. No.: 18/477,037

(22) Filed: Sep. 28, 2023

(65) Prior Publication Data

US 2024/0032129 A1 Jan. 25, 2024

Related U.S. Application Data

(63) Continuation of application No. PCT/JP2022/015026, filed on Mar. 28, 2022.

(60) Provisional application No. 63/167,227, filed on Mar. 29, 2021.

(51) Int. Cl.
*H04W 76/19* (2018.01)
*H04W 40/22* (2009.01)
*H04W 40/24* (2009.01)

(52) U.S. Cl.
CPC .......... *H04W 76/19* (2018.02); *H04W 40/22* (2013.01); *H04W 40/24* (2013.01)

(58) Field of Classification Search
None
See application file for complete search history.

(56) References Cited

U.S. PATENT DOCUMENTS

2020/0267795 A1* 8/2020 Jung .................... H04W 36/16
2022/0086749 A1* 3/2022 Ishii ..................... H04W 40/22
2022/0141910 A1* 5/2022 Muhammad ........... H04L 45/22
2022/0394797 A1* 12/2022 Pradas ................. H04W 76/30
2023/0143694 A1* 5/2023 Muhammad .......... H04W 24/04 370/225
2023/0199879 A1* 6/2023 Zhu .................. H04W 36/0033 370/329

OTHER PUBLICATIONS

Intel Corporation, "Discussion on Topology Adaptation Enhancements", 3GPP TSG RAN WG2 Meeting #113e, Electronic meeting, Jan. 25-Feb. 5, 2020, R2-2100359, total 13 pages.

(Continued)

*Primary Examiner* — Brian S Roberts
(74) *Attorney, Agent, or Firm* — Studebaker Brackett PLLC

(57) ABSTRACT

In an aspect, a communication control method is used in a cellular communication system. The communication control method includes receiving, by a relay node, a recovery attempt notification from a first parent node of the relay node. The recovery attempt notification indicates that the first parent node is attempting to recover from a failure having occurred in a backhaul link between the first parent node and a node that is a further parent node of the first parent node. The communication control method includes forwarding, by the relay node in response to reception of the recovery attempt notification, a first packet received from the first parent node to a child node of the relay node and a second packet received from the child node to a second parent node that is a parent node of the relay node.

11 Claims, 22 Drawing Sheets

(56) References Cited

OTHER PUBLICATIONS

CATT, "Summary of the email discussion [106#43] [IAB] Backhaul RLF", 3GPP TSG RAN WG2 Meeting #107, Aug. 26-30, 2019, R2-1908842, total 65 pages. Prague, Czech Republic.
3rd Generation Partnership Project; Technical Specification Group Radio Access Network; NR; NR and NG-RAN Overall Description; Stage 2 (Release 16); 3GPP TS 38.300 V16.4.0; Dec. 2020; pp. 1-149.
Qualcomm Incorporated (Email discussion rapporteur); "Report from [Post112-e][066][eIAB] Topology Adaptation (QC)"; 3GPP TSG-RAN WG2 Meeting #113e; Online; R2-2102238; Jan. 21, 2021; pp. 1-40.
Futurewei; "RAN2 impacts of Rel.17 IAB topology adaptation enhancements"; 3GPP TSG-RAN WG2 Meeting #113 electronic; R2-2101798; Online; Jan. 25-Feb. 5, 2021; pp. 1-8.

* cited by examiner

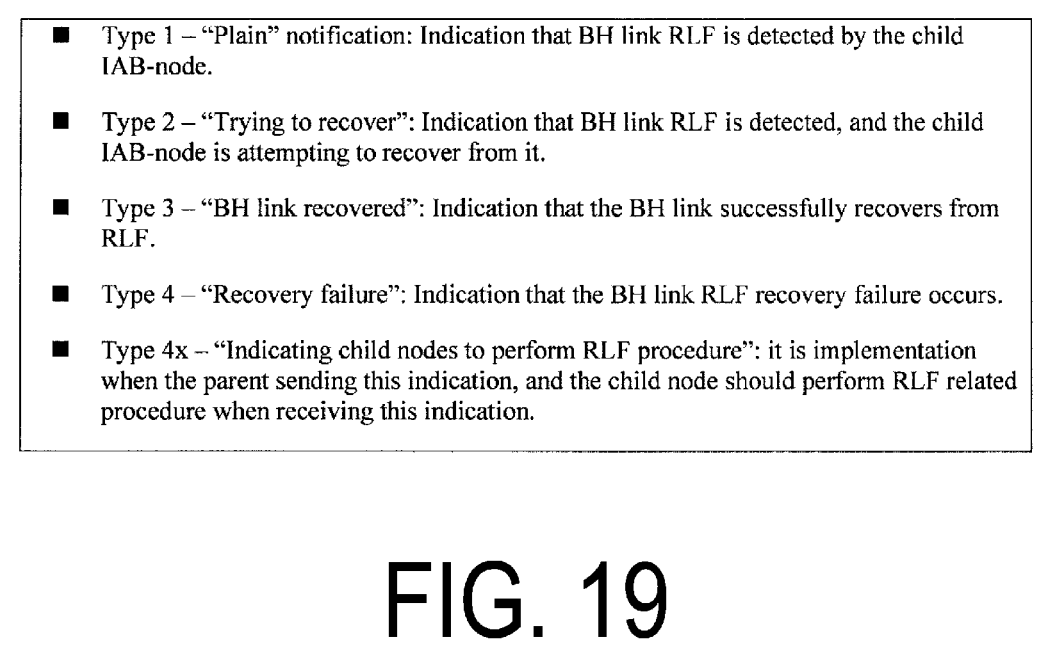

- Type 1 – "Plain" notification: Indication that BH link RLF is detected by the child IAB-node.
- Type 2 – "Trying to recover": Indication that BH link RLF is detected, and the child IAB-node is attempting to recover from it.
- Type 3 – "BH link recovered": Indication that the BH link successfully recovers from RLF.
- Type 4 – "Recovery failure": Indication that the BH link RLF recovery failure occurs.
- Type 4x – "Indicating child nodes to perform RLF procedure": it is implementation when the parent sending this indication, and the child node should perform RLF related procedure when receiving this indication.

FIG. 19

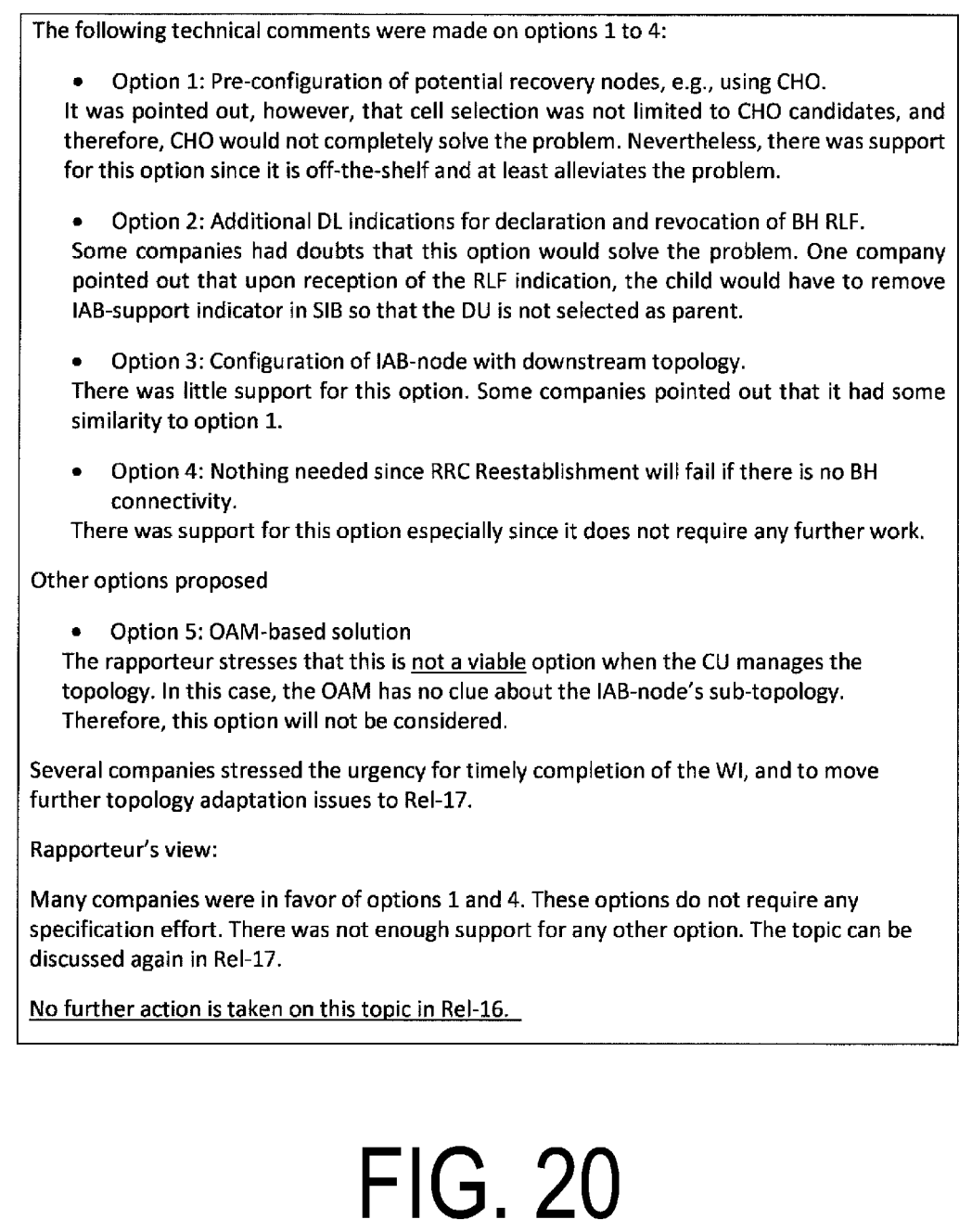

The following technical comments were made on options 1 to 4:

- Option 1: Pre-configuration of potential recovery nodes, e.g., using CHO.

It was pointed out, however, that cell selection was not limited to CHO candidates, and therefore, CHO would not completely solve the problem. Nevertheless, there was support for this option since it is off-the-shelf and at least alleviates the problem.

- Option 2: Additional DL indications for declaration and revocation of BH RLF.

Some companies had doubts that this option would solve the problem. One company pointed out that upon reception of the RLF indication, the child would have to remove IAB-support indicator in SIB so that the DU is not selected as parent.

- Option 3: Configuration of IAB-node with downstream topology.

There was little support for this option. Some companies pointed out that it had some similarity to option 1.

- Option 4: Nothing needed since RRC Reestablishment will fail if there is no BH connectivity.

There was support for this option especially since it does not require any further work.

Other options proposed

- Option 5: OAM-based solution

The rapporteur stresses that this is <u>not a viable</u> option when the CU manages the topology. In this case, the OAM has no clue about the IAB-node's sub-topology. Therefore, this option will not be considered.

Several companies stressed the urgency for timely completion of the WI, and to move further topology adaptation issues to Rel-17.

Rapporteur's view:

Many companies were in favor of options 1 and 4. These options do not require any specification effort. There was not enough support for any other option. The topic can be discussed again in Rel-17.

<u>No further action is taken on this topic in Rel-16.</u>

FIG. 20

| | Modification of PDCP protocol/procedures | Rerouting of PDCP PDUs buffered on intermediate IAB-nodes | Introducing UL status delivery |
|---|---|---|---|
| Applicable to Rel-15 UEs | No | Yes | Yes |
| Signaling overhead | Yes<br>New signaling for triggering data retransmission | Yes<br>New signaling for either deciding whether to discard the buffered data or configuring the forwarding path for the buffered data on the old route. | Yes<br>New signaling for confirming data reception and/or triggering data retransmission. |
| Support of lossless delivery of UL data | Yes | No | Yes |

FIG. 21

| Solution | Descriptions |
|---|---|
| C-1 | Access IAB node delays the sending of RLC ACKs to UE until a confirmation of reception at IAB donor [3, 4, 7].<br><br>When PDCP data recovery / PDCP re-establishment is triggered by RRC, UE retransmits all the PDCP SDUs for which the successful delivery has not been confirmed by lower layers as in the current PDCP specification.<br><br>C-1 would need UL status report from IAB donor to access IAB node. This could be UE bearer specific due to its end to end nature. |
| C-2 | Access IAB node delays the sending of RLC ACKs to UE until a confirmation of reception at its parent node, and the parent node should also delay the sending of RLC ACKs to its child node until a confirmation of reception at its parent node, and so on [4].<br><br>When PDCP data recovery / PDCP re-establishment is triggered by RRC, UE retransmits all the PDCP SDUs for which the successful delivery has not been confirmed by lower layers as in the current PDCP specification.<br><br>C-2 would need some enhancements towards RLC ACK/NACK operation between IAB nodes, e.g. with hop by hop RLC ARQ, BH RLC channels multiplex data from many UEs, potentially being served by different downstream IAB nodes. This may lead to stalling RLC ACKs for some UEs based on data being not confirmed for other UEs. |

FIG. 22

COMMUNICATION CONTROL METHOD

RELATED APPLICATIONS

The present application is a continuation based on PCT Application No. PCT/JP2022/015026, filed on Mar. 28, 2022, which claims the benefit of US Provisional Patent Application No. 63/167,227 filed on Mar. 29, 2021. The content of which is incorporated by reference herein in their entirety.

TECHNICAL FIELD

The present disclosure relates to a communication control method executed by a relay node.

BACKGROUND OF INVENTION

In the Third Generation Partnership Project (3GPP), which is a project for the standardization of cellular communication systems, introducing a new relay node referred to as an Integrated Access and Backhaul (IAB) node (for example, see "3GPP TS 38.300 V16.4.0 (2020-12)") is being considered. One or more relay nodes are involved in communication between a base station and a user equipment and perform relay for the communication.

SUMMARY

In a first aspect, a communication control method is used in a cellular communication system. The communication control method includes receiving, by a relay node, a recovery attempt notification from a first parent node of the relay node, the recovery attempt notification indicating that the first parent node is attempting to recover from a failure, the failure having occurred in a backhaul link between the first parent node and a node that is a further parent node of the first parent node. The communication control method includes forwarding, by the relay node in response to reception of the recovery attempt notification, a first packet received from the first parent node to a child node of the relay node and a second packet received from the child node to a second parent node that is a parent node of the relay node.

In a second aspect, a communication control method is used in a cellular communication system. The communication control method includes receiving, by a relay node, a recovery attempt notification from a first parent node, the recovery attempt notification indicating that the first parent node is attempting to recover from a failure, the failure having occurred in a backhaul link between a parent node of the relay node and a node that is a further parent node of the parent node. The communication control method includes broadcasting, by the relay node having received the recovery attempt notification, system information excluding IAB support, which is an information element indicating that a cell of the relay node supports IAB and that the cell is a cell to be considered as a cell selection for an IAB node, when no alternative path to a donor node is present.

In a third aspect, a communication control method is used in a cellular communication system. The communication control method includes receiving, by a relay node, a configuration of not performing a predetermined transmission or of performing the predetermined transmission a predetermined number of times of transmission or less when the relay node receives a recovery attempt notification from a parent node of the relay node, the recovery attempt notification indicating that the parent node is attempting to recover from a failure, the failure having occurred in a backhaul link between the parent node and a node that is a further parent node of the parent node. The communication control method includes, by the relay node in response to reception of the recovery attempt notification and in accordance with the configuration, not performing the predetermined transmission or performing the predetermined transmission the predetermined number of times of transmission or less. Here, the predetermined transmission is a transmission, to the parent node, of a scheduling request, a buffer status report and/or a UL packet.

In a fourth aspect, a communication control method is used in a cellular communication system. The communication control method includes receiving, by a relay node, a recovery attempt notification from a first parent node of the relay node, the recovery attempt notification indicating that the first parent node is attempting to recover from a failure, the failure having occurred in a backhaul link between the first parent node and a node that is a further parent node of the first parent node. The communication control method includes transmitting, by the relay node in response to reception of the recovery attempt notification, the reception of the recovery attempt notification to a donor node via a second parent node that is a parent node of the relay node.

BRIEF DESCRIPTION OF THE DRAWINGS

FIG. 19 is a diagram illustrating types of BH RLF notifications.

FIG. 20 is a diagram illustrating identified solutions for avoiding reestablishment to a descendant node.

FIG. 21 is a diagram illustrating a comparison of mechanisms for lossless delivery of UL data in a case of hop-by-hop RLC ARQ.

FIG. 22 is a diagram illustrating options of introduction of UL status delivery.

DESCRIPTION OF EMBODIMENTS

A cellular communication system according to an embodiment is described with reference to the drawings. In the description of the drawings, the same or similar parts are denoted by the same or similar reference signs.

Configuration of Cellular Communication System

First, a configuration example of the cellular communication system according to an embodiment will be described. In an embodiment, a cellular communication system 1 is a 3GPP 5G system. Specifically, a radio access scheme in the cellular communication system 1 is New Radio (NR) being a 5G radio access scheme. Note that Long Term Evolution (LTE) may be at least partially applied to the cellular communication system. A future cellular communication system such as 6G may be applied to the cellular communication system.

Figure 1:
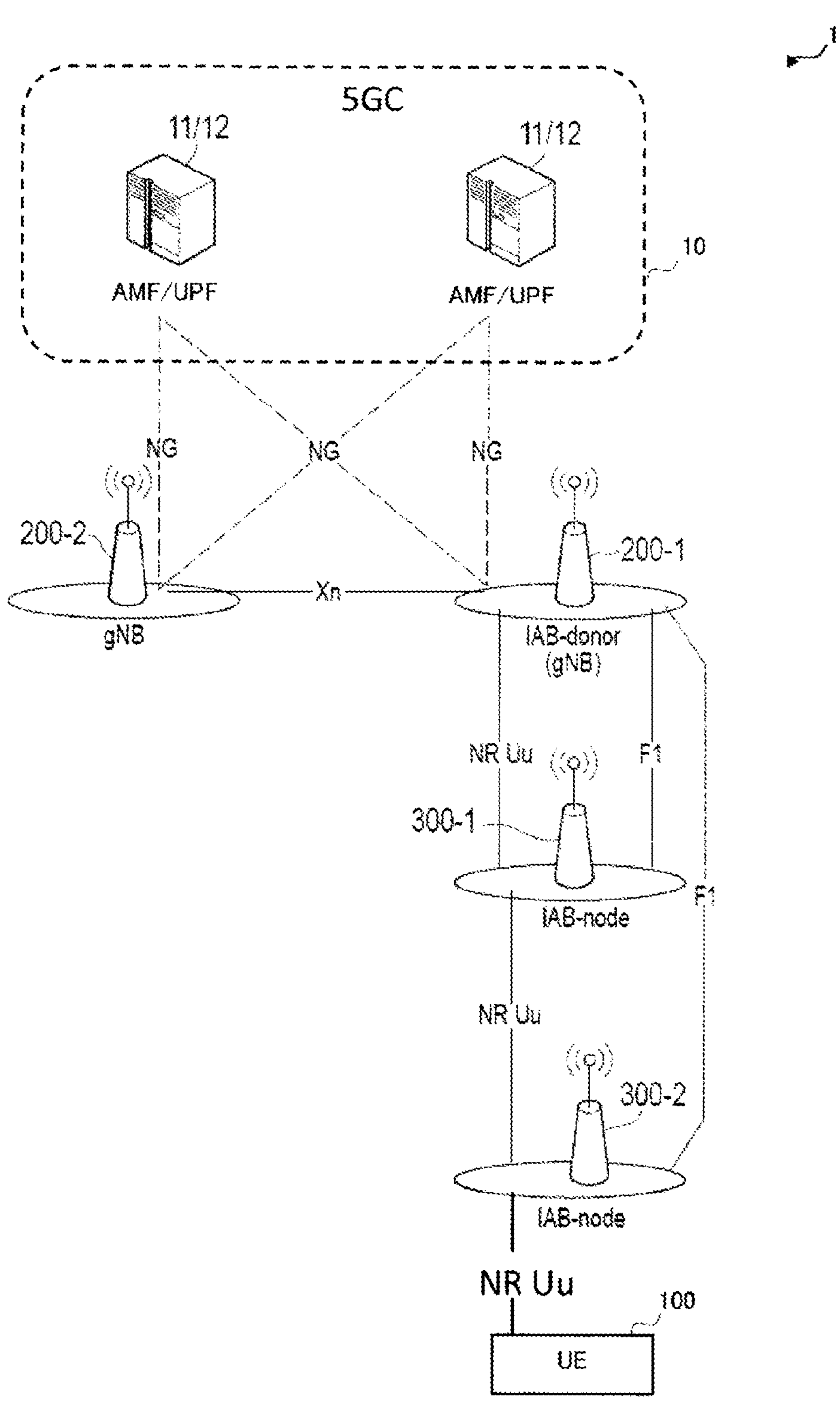
FIG. 1 is a diagram illustrating a configuration example of a cellular communication system according to an embodiment.

FIG. 1 is a diagram illustrating a configuration example of the cellular communication system 1 according to an embodiment.

As illustrated in FIG. 1, the cellular communication system 1 includes a 5G core network (5GC) 10, a User Equipment (UE) 100, base station apparatuses (hereinafter, also referred to as base stations in some cases) 200-1 and 200-2, and IAB nodes 300-1 and 300-2. The base station 200 may be referred to as a gNB.

An example in which the base station 200 is an NR base station is mainly described below, but the base station 200 may also be an LTE base station (i.e., an eNB).

Note that hereinafter, the base stations 200-1 and 200-2 may be referred to as a gNB 200 (or the base station 200 in some cases), and the IAB nodes 300-1 and 300-2 may be referred to as an IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. Hereinafter, a "cell" may be used without being distinguished from a base station such as the gNB 200. One cell belongs to one carrier frequency.

Each gNB 200 is interconnected to the 5GC 10 via an interface referred to as an NG interface. FIG. 1 illustrates a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. An F1 protocol is a communication protocol between the CU and the DU and includes an F1-C protocol that is a control plane protocol and an F1-U protocol that is a user plane protocol.

The cellular communication system 1 supports an IAB that uses NR for the backhaul to enable wireless relay of the NR access. The donor gNB (or the donor node, hereinafter also referred to as the "donor node" in some cases) 200-1 is a donor base station that is a terminal node of the NR backhaul on the network side and includes additional functionality for supporting the IAB. The backhaul can implement multi-hop via a plurality of hops (i.e., a plurality of IAB nodes 300).

FIG. 1 illustrates an example in which the IAB node 300-1 is wirelessly connected to the donor node 200-1, the IAB node 300-2 is wirelessly connected to the IAB node 300-1, and the F1 protocol is transmitted in two backhaul hops.

The UE 100 is a mobile wireless communication apparatus that performs wireless communication with the cells. The UE 100 may be any type of apparatus as long as the UE 100 is an apparatus that performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor node 200-1 via the IAB node 300-2 and the IAB node 300-1.

Figure 2:
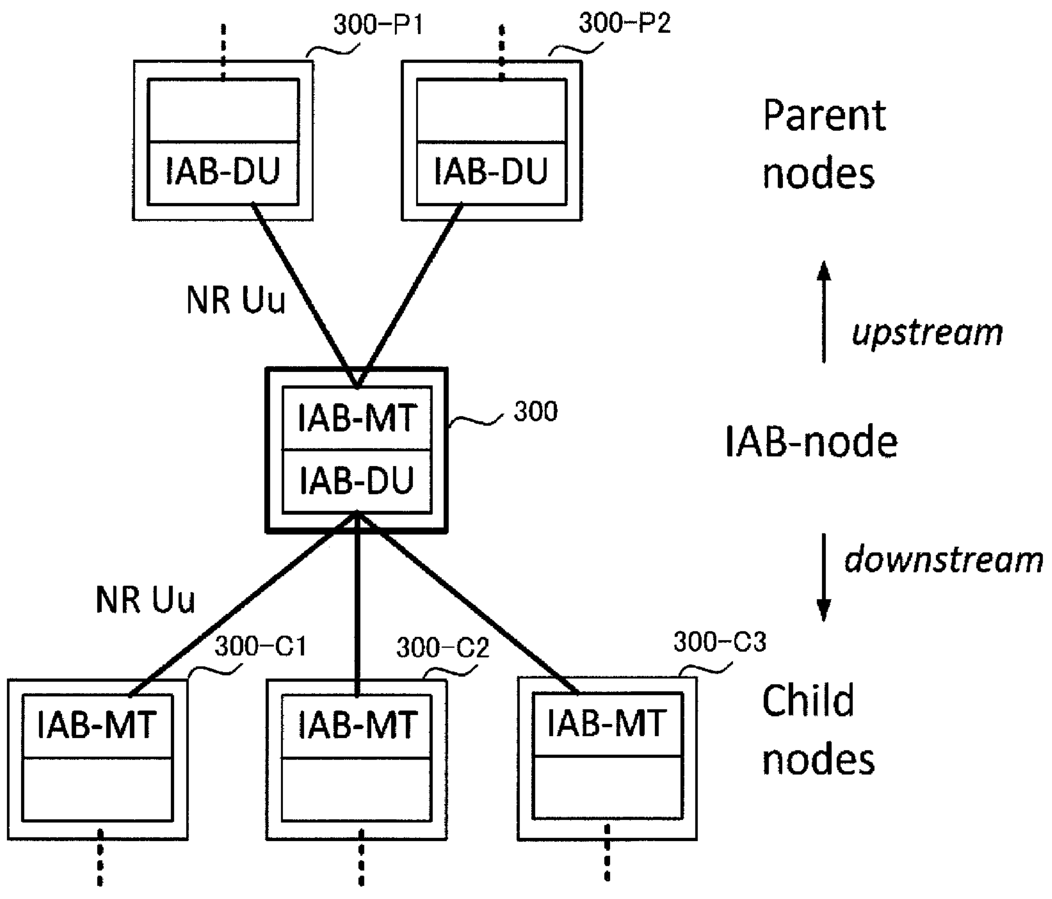
FIG. 2 is a diagram illustrating a relationship between an IAB node, Parent nodes, and Child nodes.

FIG. 2 is a diagram illustrating a relationship between the IAB node 300, Parent nodes, and Child nodes.

As illustrated in FIG. 2, each IAB node 300 includes an IAB-DU corresponding to a base station functional unit and an IAB-Mobile Termination (MT) corresponding to a user equipment functional unit.

Neighboring nodes of the IAB-MT (i.e., upper node) of an NR Uu wireless interface are referred to as "parent nodes". The parent node is the DU of a parent IAB node or the donor node 200. A radio link between the IAB-MT and each parent node is referred to as a backhaul link (BH link). FIG. 2 illustrates an example in which the parent nodes of the IAB node 300 are IAB nodes 300-P1 and 300-P2. Note that the direction toward the parent nodes is referred to as upstream. As viewed from the UE 100, the upper nodes of the UE 100 can correspond to the parent nodes.

Neighboring nodes of the IAB-DU (i.e., lower nodes) of an NR access interface are referred to as "child nodes". The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the donor node 200-1. FIG. 2 illustrates an example in which the child nodes of the IAB node 300 are IAB nodes 300-C1 to 300-C3; however, the UE 100 may be included in the child nodes of the IAB node 300. Note that the direction toward the child nodes is referred to as downstream.

All of the IAB nodes 300 connected to the donor node 200 via one or more hops form a Directed Acyclic Graph (DAG) topology (which may be referred to as "topology" below) rooted at the donor node 200. In this topology, the neighboring nodes of the IAB-DU in the interface are child nodes, and the neighboring nodes of the IAB-MT in the interface are parent nodes as illustrated in FIG. 2. The donor node 200 performs, for example, centralized management on resources, topology, and routes of the IAB topology. The donor node 200 is a gNB that provides network access to the UE 100 via a network of backhaul links and access links.

Configuration of Base Station

Figure 3:
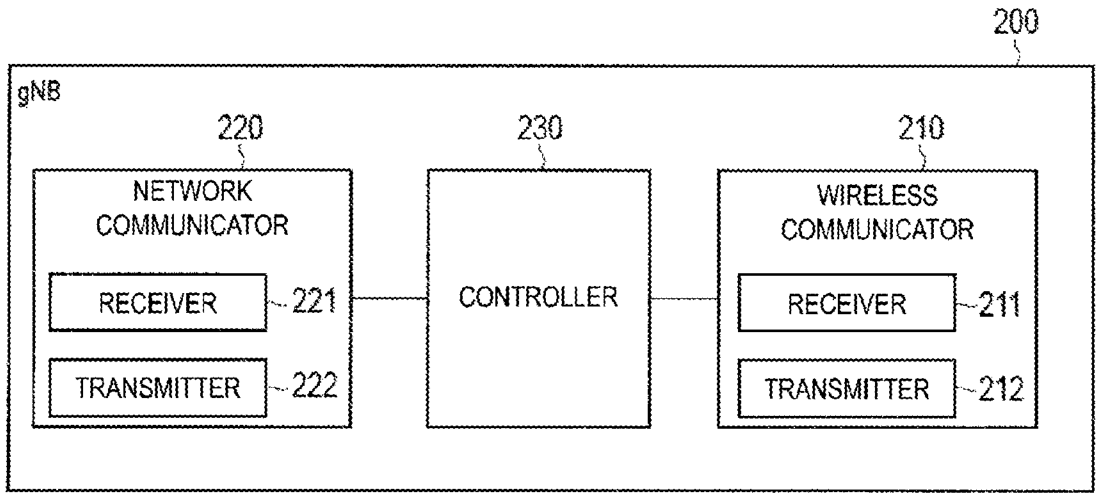
FIG. 3 is a diagram illustrating a configuration example of a gNB (base station) according to an embodiment.

A configuration of the gNB 200 that is a base station according to the embodiment is described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna and converts (down-converts) a radio signal received by the antenna into a baseband signal (reception signal) which is then transmitted to the controller 230. The transmitter 212 performs various types of transmission under control of the controller 230. The transmitter 212 includes an antenna and converts (up-converts) the baseband signal (transmission signal) output by the controller 230 into a radio signal which is then transmitted from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from an external source and outputs the reception signal to the controller 230. The transmitter 222 performs various types of transmission under control of the controller 230. The transmitter 222 transmits the transmission signal output by the controller 230 to an external destination.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below. In each example described below, the controller 230 may perform each processing operation in the gNB 200 (or the donor node 200).

Configuration of Relay Node

Figure 4:
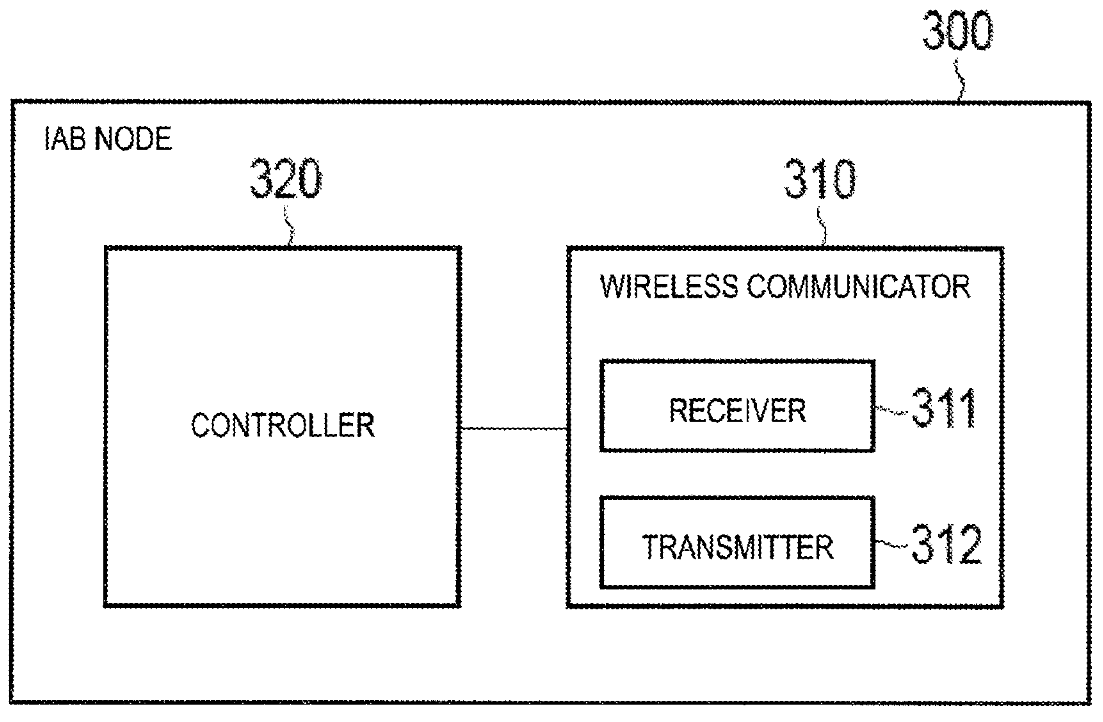
FIG. 4 is a diagram illustrating a configuration example of an IAB node (relay node) according to an embodiment.

A configuration of the IAB node 300 that is a relay node (or a relay node apparatus, which is also referred to as a relay node below in some cases) according to the embodiment is described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication with the gNB 200 (BH link) and wireless communication with the UE 100 (access link). The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna and converts (down-converts) a radio signal received by the antenna into a baseband signal (reception signal) which is then transmitted to the controller 320. The transmitter 312 performs various types of transmission under control of the controller 320. The transmitter 312 includes an antenna and converts (up-converts) the baseband signal (transmission signal) output by the controller 320 into a radio signal which is then transmitted from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 320 may perform each processing operation in the IAB node 300. The controller 320 may execute each function of the IAB-MT or the IAB-DU in the IAB node 300.

Configuration of User Equipment

Figure 5:
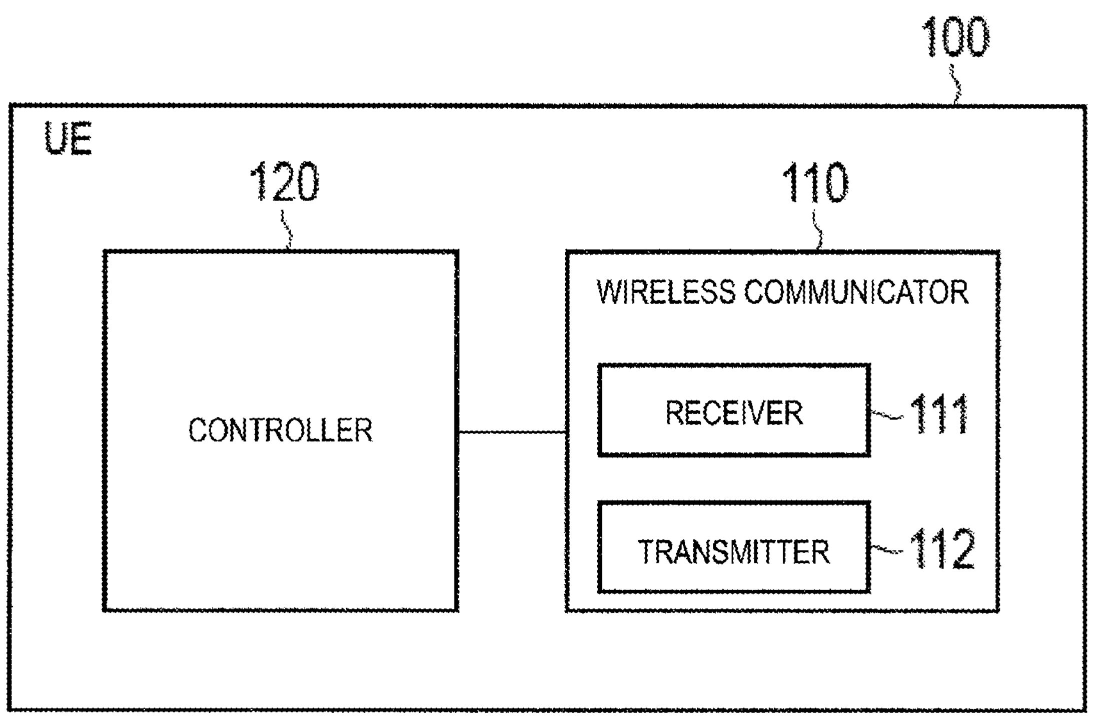
FIG. 5 is a diagram illustrating a configuration example of a UE (user equipment) according to an embodiment.

A configuration of the UE 100 that is a user equipment according to the embodiment is described next. FIG. 5 is a diagram illustrating a configuration example of the UE 100. As illustrated in FIG. 5, the UE 100 includes a wireless communicator 110 and a controller 120.

The wireless communicator 110 performs wireless communication in the access link, i.e., wireless communication with the gNB 200 and wireless communication with the IAB node 300. The wireless communicator 110 may also perform wireless communication in a sidelink, i.e., wireless communication with another UE 100. The wireless communicator 110 includes a receiver 111 and a transmitter 112. The receiver 111 performs various types of reception under control of the controller 120. The receiver 111 includes an antenna and converts (down-converts) a radio signal received by the antenna into a baseband signal (reception signal) which is then transmitted to the controller 120. The transmitter 112 performs various types of transmission under control of the controller 120. The transmitter 112 includes an antenna and converts (up-converts) the baseband signal (transmission signal) output by the controller 120 into a radio signal which is then transmitted from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 120 may perform each processing operation in the UE 100.

Configuration of Protocol Stack

Figure 6:
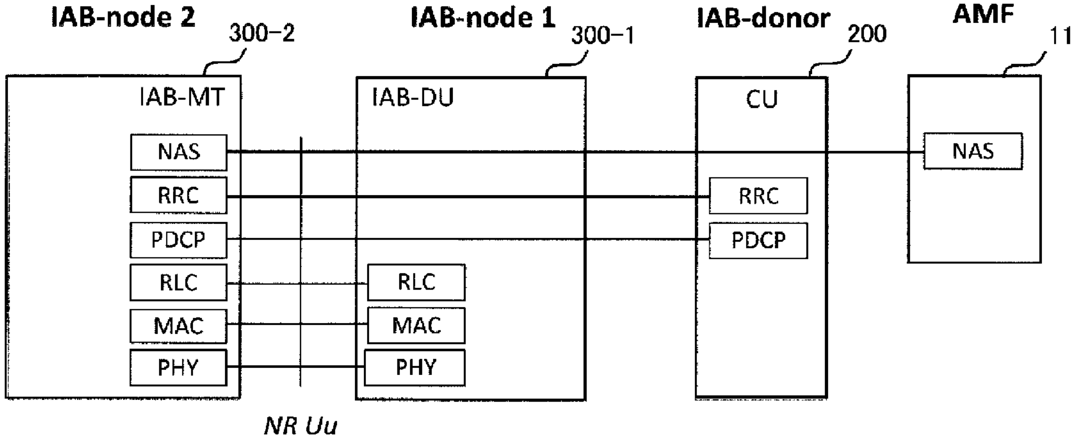
FIG. 6 is a diagram illustrating an example of a protocol stack related to an RRC connection and a NAS connection of an IAB-MT.

A configuration of a protocol stack according to the embodiment is described next. FIG. 6 is a diagram illustrating an example of a protocol stack related to an RRC connection and a NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs preferential control of data, retransmission processing using a hybrid ARQ (HARQ), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines the transport format (transport block size, modulation and coding scheme (MCS)) and the assignment of resource blocks in the uplink and the downlink.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor node 200 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the donor node 200. When an RRC connection to the donor node 200 is present, the IAB-MT is in an RRC connected state. When no RRC connection to the donor node 200 is present, the IAB-MT is in an RRC idle state.

The NAS layer which is positioned higher than the RRC layer performs session management, mobility management, and the like. NAS signaling is transmitted between the NAS layer of the IAB-MT of the IAB node 300-2 and the NAS layer of the AMF 11.

Figure 7:
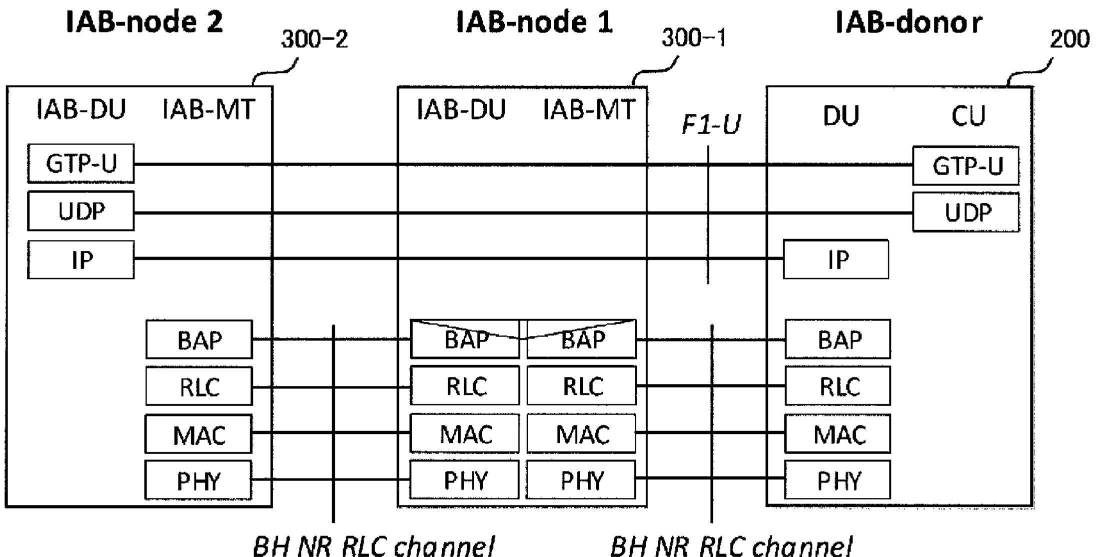
FIG. 7 is a diagram illustrating an example of a protocol stack related to an F1-U protocol.
Figure 8:
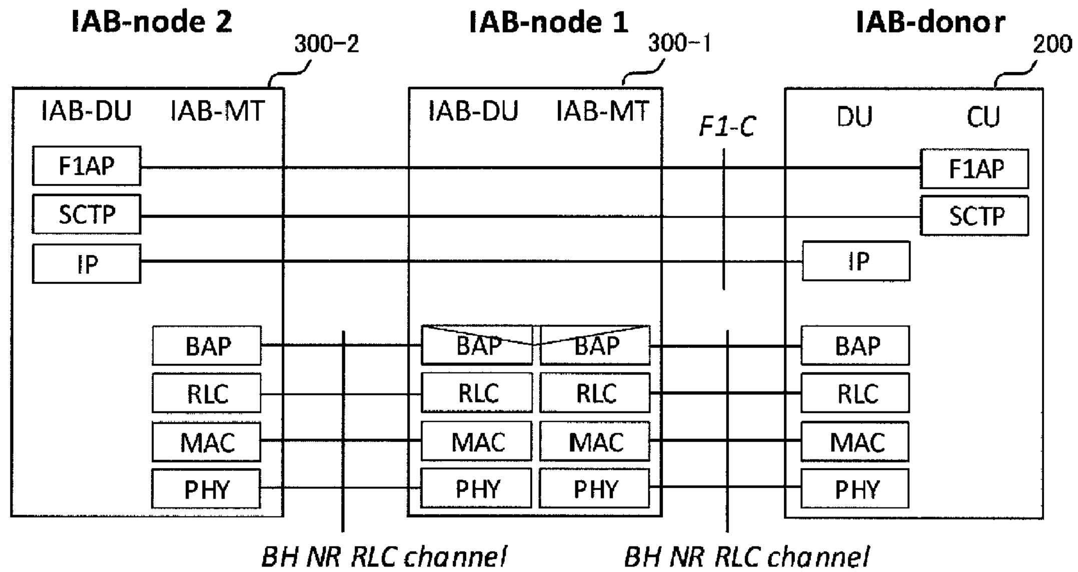
FIG. 8 is a diagram illustrating an example of a protocol stack related to an F1-C protocol.

FIG. 7 is a diagram illustrating a protocol stack related to an F1-U protocol. FIG. 8 is a diagram illustrating a protocol stack related to an F1-C protocol. Here, an example in which the donor node 200 is divided into a CU and a DU is illustrated.

As illustrated in FIG. 7, each of the IAB-MT of the IAB node 300-2, the IAB-DU of the IAB node 300-1, the IAB-MT of the IAB node 300-1, and the DU of the donor node 200 includes a Backhaul Adaptation Protocol (BAP) layer as a higher layer of the RLC layer. The BAP layer performs routing processing, and bearer mapping and demapping processing. In the backhaul, the IP layer is transmitted via the BAP layer to allow routing through a plurality of hops.

In each backhaul link, a Protocol Data Unit (PDU) of the BAP layer is transmitted by the backhaul RLC channel (BH NR RLC channel). Configuring multiple backhaul RLC channels in each BH link enables the prioritization and Quality of Service (QoS) control of traffic. The association between the BAP PDU and the backhaul RLC channel is executed by the BAP layer of each IAB node 300 and the BAP layer of the donor node 200.

Note that the CU of the donor node 200 is a gNB-CU function of the donor node 200 that terminates the F1 interface to the IAB node 300 and the DU of the donor node 200. The DU of the donor node 200 is a gNB-DU function of the donor node 200 that hosts an IAB BAP sublayer and provides a wireless backhaul to the IAB node 300.

As illustrated in FIG. 8, the protocol stack of the F1-C protocol includes an F1AP layer and an SCTP layer instead of a GTP-U layer and a UDP layer illustrated in FIG. 7.

Note that in the description below, processing or operation performed by the IAB-DU and the IAB-MT of the IAB may be simply described as processing or operation of the "TAB". For example, in the description, transmitting, by the IAB-DU of the IAB node 300-1, a message of the BAP layer to the IAB-MT of the IAB node 300-2 is assumed to correspond to transmitting, by the IAB node 300-1, the message to the IAB node 300-2. Processing or operation of the DU or CU of the donor node 200 may be described simply as processing or operation of the "donor node".

An upstream direction and an uplink (UL) direction may be used without distinction. A downstream direction and a downlink (DL) direction may be used without distinction.

First Embodiment

A first embodiment will be described with reference to the drawings as appropriate.

Routing

One of the functions of the BAP layer is to route packets to the next hop. In a network including a plurality of IAB nodes 300, each IAB node 300 forwards a received packet to the next hop such that the packet is finally transmitted to the destination IAB node 300 (or the donor node 200). The routing is, for example, to control which IAB node 300 the received packet is forwarded to.

Packet routing is performed, for example, as follows. In other words, the IAB-CU of the donor node 200 provides a routing configuration to an IAB-DU of each IAB node 300. The provided routing configuration includes a routing ID and the BAP address of the next hop. The routing ID is composed of a (destination) BAP address and a BAP path ID. Upon receiving a packet (BAP packet), each IAB node 300 reads the destination BAP address included in the header of the packet. Each IAB node 300 determines whether the destination BAP address matches its own BAP address. Each IAB node 300 determines that the data packet has reached the destination when the destination BAP address matches its own BAP address. On the other hand, each IAB node 300 forwards the packet to an IAB node 300 having the BAP address of the next hop in accordance with the routing configuration when the destination BAP address does not match its own BAP address.

As described above, each IAB node 300 forwards the received BAP packet to the next hop in accordance with the routing configuration provided by the donor node 200.

BH RLF Indication

In a network including a plurality of IAB nodes 300, a failure may occur in a backhaul link between the IAB nodes 300. Such a failure is referred to as "Backhaul Radio Link Failure (BH RLF)".

Figure 9:
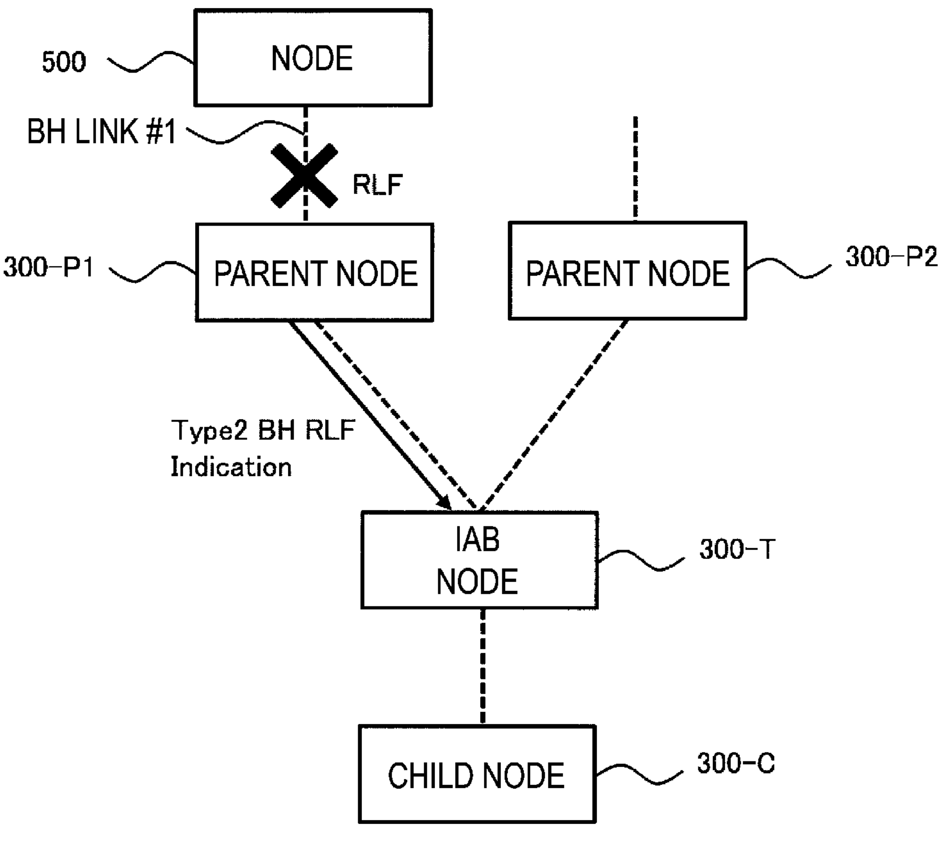
FIG. 9 is a diagram illustrating an example of BH RLF according to a first embodiment.

FIG. 9 is a diagram illustrating an example of BH RLF according to the first embodiment. FIG. 9 illustrates an example of a case where the BH RLF occurs in a BH link #1 between an IAB node 300-P1 that is the parent node of an IAB node 300-T and a node 500 that is the further parent node of the IAB node 300-P1. Note that the node 500 is a parent node of the parent node 300-P1 or the gNB 200 (or the donor node 200).

The IAB-MT of the parent node 300-P1 is assumed to detect a BH RLF. The IAB-DU of the parent node 300-P1 transmits a failure occurrence notification to the IAB node 300-T on the downstream side.

The failure occurrence notification indicating that a BH RLF has been detected is referred to as Type1 BH RLF Indication. The BH link RLF detected by the child node (which is the parent node 300-P1 in the example of FIG. 9) may be the Type1 BH RLF Indication.

A recovery attempt notification indicating that recovery from a failure (BH RLF) occurring in the backhaul link is being attempted is referred to as Type2 BH RLF Indication. The notification indicating that the child node (the parent node 300-P1 in the example of FIG. 9) is attempting to recover from the BH RLF is the Type2 BH RLF Indication. Note that the Type1 BH RLF Indication and the Type2 BH RLF Indication are not distinguished from each other, the BH RLF Indications are referred to as Type1/2 BH RLF Indication. Note that although an example of the Type2 BH RLF Indication will mainly be described in each embodiment, the Type2 BH RLF Indication may be replaced with the Type1 BH RLF Indication. The reason is as follows. As described above, the Type1 BH RLF Indication is transmitted when a BH RLF is detected and the Type2 BH RLF Indication is transmitted when recovery is attempted, but in the IAB node 300, processing of attempting to recover from a BH RLF is performed immediately after the BH RLF is detected, and thus the Type1 BH RLF Indication and the Type2 BH RLF Indication are substantially the same notification.

A recovery notification indicating that the BH link has recovered from the BH RLF is also present. Such recovery notification is referred to as "Type3 BH RLF Indication". A failure notification indicating that the BH link has failed to recover from the RLF is also present. Such a failure notification is referred to as "Type4 BH RLF Indication".

In the example illustrated in FIG. 9, the parent node 300-P1 transmits the Type2 BH RLF Indication to the IAB node 300-T, which is a child node of the parent node 300-P1. In response to receiving the Type2 BH RLF Indication, the IAB node 300-T may perform various types of control. Details will be described below.

Note that the Type2 BH RLF Indication may hereinafter be referred to as a the Type2 Indication.

Local Rerouting

As described above, in a network including a plurality of IAB nodes 300, a BH RLF may occur in a backhaul link between the IAB nodes 300.

In a multi-hop network where packets are forwarded by a plurality of IAB nodes 300 one after another, data packets may be forwarded to a destination IAB node 300 (or donor node 200) via an alternative path. When a line failure occurs, forwarding a data packet using an alternative path may be referred to as local rerouting. The local rerouting may be performed by selecting an alternative path, while ignoring a routing configuration provided by the donor node 200. Alternatively, the local rerouting may be performed by selecting an alternative path from alternative path candidates configured by the donor node 200.

The example illustrated in FIG. 9 represents the IAB node 300-T performing local rerouting to the parent node 300-P2 on the alternative path. Note that the two parent nodes 300-P1 and 300-P2 are connected to the same donor node 200.

Communication Control Method According to First Embodiment

According to an agreement made at the 3GPP RAN2 meeting, the Type2 Indication may be used to trigger local rerouting.

As described above, the routing configuration provided by the donor node 200 includes the BAP address of the next hop. Accordingly, the IAB node 300 forwards the packet to the next hop in accordance with the routing configuration. However, when the local rerouting is applied, the IAB node 300 may cause all packets to be forwarded to the alternative path. For example, in the example of FIG. 9, the IAB node 300-T may forward both a packet received from the parent node 300-P1 and a packet received from the child node 300-C to the parent node 300-P2 by the local rerouting. Alternatively, when a plurality of child nodes 300-C are present, the IAB node 300-T may forward a packet received from the parent node 300-P1 to another child node 300-C on the alternative path.

On the other hand, the IAB node 300-T receiving the BH RLF Indication such as the Type1 BH RLF Indication or the Type2 BH RLF Indication means that a radio link failure has occurred in the BH link #1 between the parent node 300-P1 and the node 500. In this case, the BH link between the parent node 300-P1 and the IAB node 300-T may well be normal. The first embodiment is based on the assumption that the BH link between the parent node 300-P1 and the IAB node 300-T is normal.

Accordingly, in the first embodiment, upon receiving the Type2 Indication from the parent node 300-P1, the IAB node 300-T performs local rerouting in the upstream direction of the IAB node 300-T rather than on all packets. The IAB node 300-T performs normal routing configured by the donor node 200 in the downstream direction.

To be more specific, first, a relay node (e.g., IAB node 300-T) receives, from a first parent node (e.g., parent node 300-P1) of the relay node, a recovery attempt notification (e.g., Type2 Indication) indicating that the first parent node is attempting to recover from a failure occurring in a backhaul link between the first parent node and a node (e.g., node 500) that is a further parent node of the first parent node. Second, in response to receiving the recovery attempt notification, the relay node forwards the first packet received from the first parent node to a child node (e.g., child node 300-C) of the relay node, and forwards the second packet received from the child node to a second parent node (e.g., parent node 300-P2) that is a parent node of the relay node. Alternatively, the relay node may check the destination BAP address included in the header of the received packet, determine the upstream direction when the BAP address matches the BAP address of the donor node configured in advance, and determine the downstream direction when the BAP address does not match the BAP address of the donor node configured in advance.

Thus, the IAB node 300-T performs local rerouting for packet transmission in the upstream direction, and performs, on packet transmission in the downstream direction, routing configuration provided by the donor node 200. This avoids a change in forwarding destinations of all the packets to be forwarded, allowing the IAB node 300-T to appropriately forward the packets.

Figure 10:
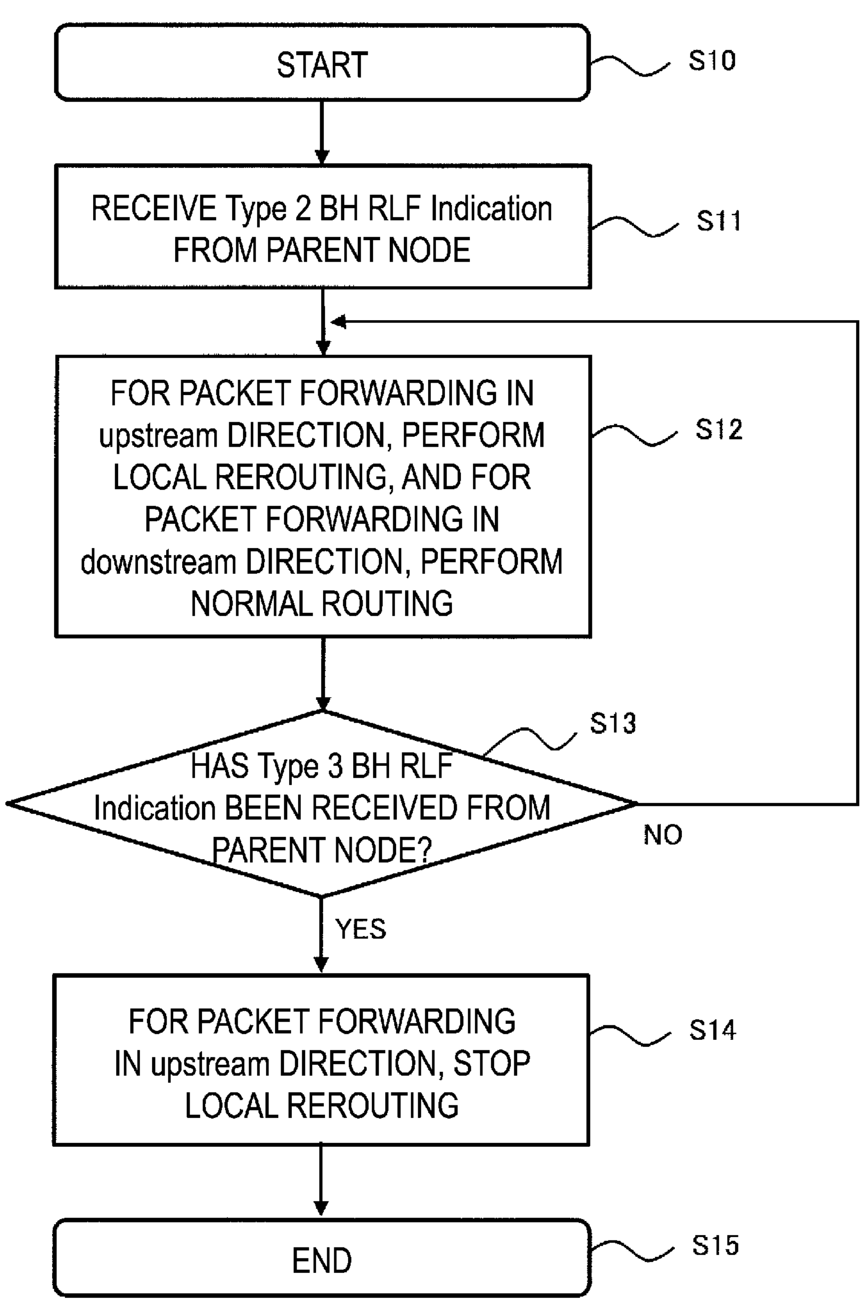
FIG. 10 is a flowchart illustrating an operation example according to the first embodiment.

FIG. 10 is a flowchart illustrating an operation example according to the first embodiment. The operation example will be described by appropriately using the configuration example illustrated in FIG. 9.

The IAB node 300-T starts processing in step S10 as illustrated in FIG. 10.

In step 511, the IAB node 300-T receives the Type2 Indication from the parent node 300-P1.

In step S12, the IAB node 300-T performs local rerouting on packet forwarding in the upstream direction, and performs, on packet forwarding in the downstream direction, routing configuration (hereinafter, may be referred to as "normal routing") provided by the donor node 200.

The upstream packets include upstream packets buffered in the IAB node 300-T and packets newly received from the child node 300-C after receiving the Type2 Indication. To be more specific, the upstream packets include packets existing in the IAB-MT of the IAB node 300-T and waiting to be transmitted in the upstream direction and packets received from the child node 300-C by the IAB-DU of the IAB node 300-T after receiving the Type2 Indication.

The IAB-MT (or BAP entity) of IAB node 300-T performs local rerouting on the upstream packets, selects an alternative path, and forwards the packets to the parent node 300-P1 on the alternative path (different from parent node 300-P2).

The downstream packets include downstream packets buffered in the IAB node 300-T and packets received from the parent node 300-P1 after receiving the Type2 Indication. To be more specific, the downstream packets include packets existing in the IAB-DU of the IAB node 300-T and waiting to be transmitted in the downstream direction and packets received from the parent node 300-P1 by the IAB-MT of the IAB node 300-T after receiving the Type2 Indication. The IAB-DU (or BAP entity) of the IAB node 300-T performs normal routing on the downstream packets and forwards the packets in accordance with the routing configuration.

In step S13, the IAB node 300-T determines whether the Type3 BH RLF Indication (hereinafter, may be referred to as "Type3 Indication") has been received from the parent node 300-P1. As described above, the Type3 Indication is a recovery notification indicating that the BH PLF is recovered.

In step S13, when not receiving the Type3 Indication (NO in step S13), the IAB node 300-T proceeds to step S12 and performs the processing of step S12 until the IAB node 300-T receives the Type3 Indication.

On the other hand, in step S13, upon receiving the Type3 Indication (YES in step S13), the IAB node 300-T performs processing in step S14.

In step S14, the IAB node 300-T stops performing the local rerouting on the packet forwarding in the upstream direction. In this case, since the IAB node 300-T has received the Type3 Indication from the parent node 300-P1, the IAB node 300-T stops the local rerouting. Due to the stoppage of the local rerouting, the IAB node 300-T forwards the upstream packets to the parent node 300-P1.

Then, in step S15, the IAB node 300-T ends a series of processing operations.

Second Embodiment

Now, a second embodiment will be described.

According to the agreement made at the 3GPP RAN2 meeting, the Type2 Indication may be used to trigger deactivation of IAB-Support included in System Information Block (SIB, system information) 1.

The IAB support is one of the information elements included in the SIB1. The IAB support is an information element (IAB-Support IE) indicating that the cell of the relay node (for example, the IAB node 300-T) supports IAB and the cell is a cell to be considered as cell selection for the IAB node. Upon receiving the SIB1 including the IAB support (IAB-Support IE), the UE 100 or the child node 300-C can recognize that the IAB node 300-T having transmitted the SIB1 supports the IAB.

However, as in the first embodiment, for example, in FIG. 9, the IAB node 300-T is assumed to receive the Type2 Indication from the parent node 300-P1, which is the parent node of the IAB node 300-T. In this case, when an alternative path from the IAB node 300-T to the donor node 200 is present, the donor node 200 can be accessed using the alternative path. On the other hand, when no alternative path from the IAB node 300-T to the donor node 200 is present, the IAB node 300-T may not be able to access the donor node 200, and the child node 300-C or UE 100 may not be able to receive services from the network via the IAB node 300-T.

Accordingly, in the second embodiment, upon receiving the Type2 Indication from the parent node 300-P1, the IAB node 300-T broadcasts system information not including the IAB support (IAB-Support IE), which is an information element, when the IAB node 300-T includes no alternative path to the donor node. On the other hand, when including an alternative path to the donor node 200, the IAB node 300-T broadcasts system information including the IAB support.

To be more specific, a relay node (e.g., IAB node 300-T) receives, from a first parent node, a recovery attempt notification (e.g., Type2 Indication) indicating that the first parent node is attempting to recover from a failure having occurred in a backhaul link between a parent node of the relay node (e.g., parent node 300-P1) and a node that is a further parent node of the parent node (e.g., node 500). Second, upon receiving the recovery attempt notification, the relay node broadcasts system information that does not include the IAB support, which is an information element indicating that the cell of the relay node supports the IAB and that the cell is a cell to be considered as the cell selection for the IAB node when the relay node includes no alternative path to the donor node.

Thus, the child node 300-C or the UE 100 can appropriately determine whether the child node 300-C or the UE 100 can receive IAB services from the IAB node 300-T.

Figure 11:
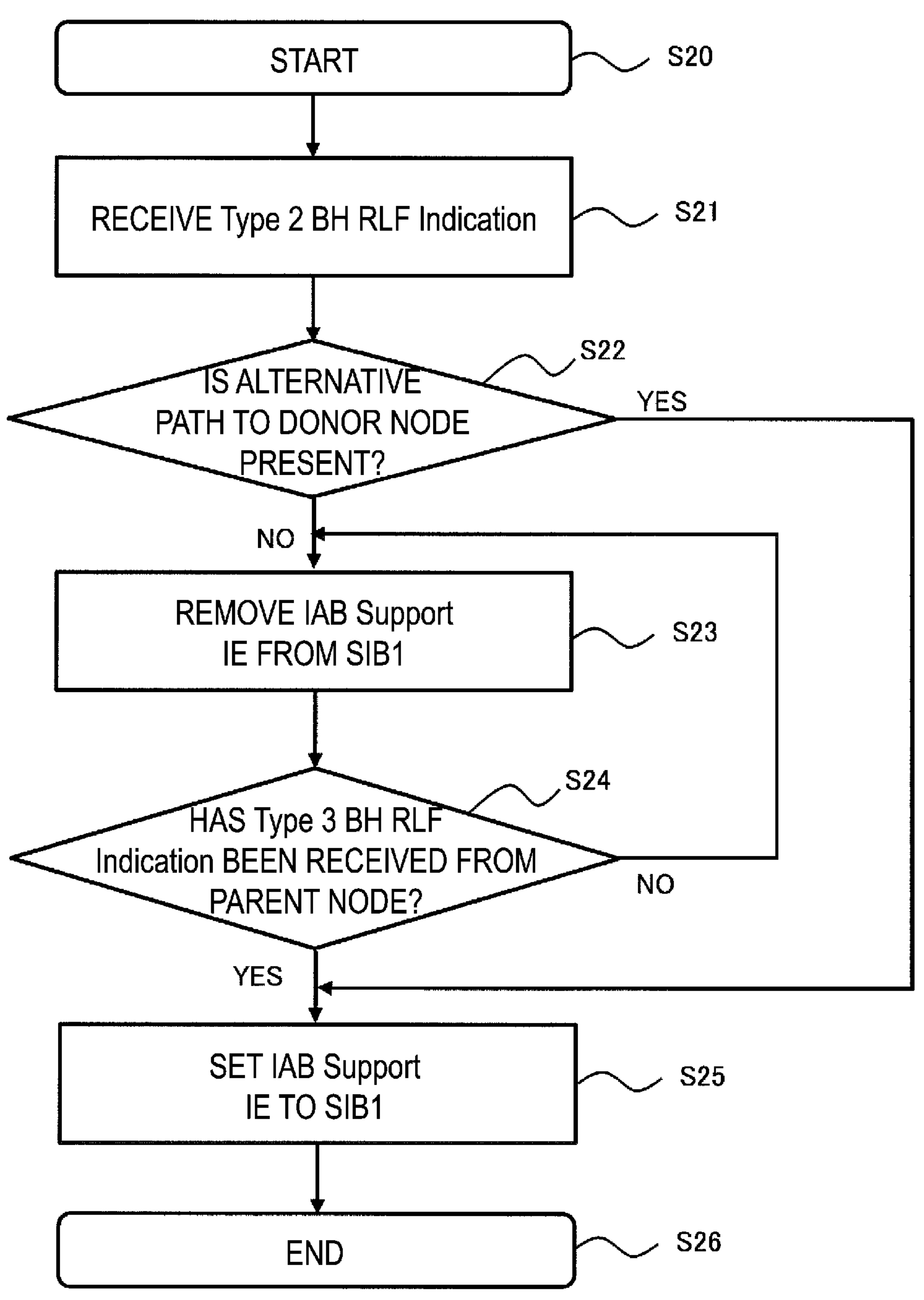
FIG. 11 is a flowchart illustrating an operation example according to a second embodiment.

FIG. 11 is a flowchart illustrating an operation example according to the second embodiment. The operation example will be described by appropriately using the configuration example illustrated in FIG. 9.

The IAB node 300-T starts processing in step S20 as illustrated in FIG. 11.

In step S21, the IAB node 300-T receives the Type2 Indication from the parent node 300-P1.

In step S22, the IAB node 300-T determines whether an alternative path to the donor node 200 is present. For example, in FIG. 9, Dual Connectivity (DC) is assumed to be configured in which the master node (or master cell group) corresponds to the parent node 300-P1 and in which the secondary node (or secondary cell group) corresponds to the parent node 300-P2. In such a case, the IAB node 300-T can determine that an alternative path to the parent node 300-P2 is present as an alternative path to the parent node 300-P1. On the other hand, when no such dual connectivity is configured in the IAB node 300-T, and when the IAB node 300-T has a single connection to the parent node 300-P1, no alternative path is present. Therefore, the IAB node 300-T may determine, based on the DC configuration, that an alternative path to the donor node 200 is present if the parent node 300-P2 is configured as a secondary node, and may determine that no alternative path to the donor node 200 is present if no DCs are configured.

The CU of the donor node 200 performs the DC configuration for the IAB-MT of the IAB node 300-T by using the RRC Reconfiguration message, for example.

In step S22, when the IAB node 300-T determines that no alternative path to the donor node 200 is present (NO in step S22), the IAB node 200-T performs the processing in step S23.

In step S23, the IAB node 300-T removes the IAB support (IAB-Support IE), which is an information element, from the SIB1. The IAB node 300-T then broadcasts the SIB1 including no IAB support.

In step S24, the IAB node 300-T determines whether the IAB node 300-T has received the Type3 Indication from the parent node 300-P1.

In step S24, upon determining that the IAB node 300-T has not received the Type3 Indication from the parent node 300-P1 (NO in step S24), the IAB node 300-T repeats the processing in step S23 until the IAB node 300-T receives the Type3 Indication.

On the other hand, in step S24, upon determining that the IAB node 300-T has received the Type3 Indication from the parent node 300-P1 (YES in step S24), the IAB node 300-T executes processing in step S25.

In step S25, the IAB node 300-T sets, in the SIB1, the IAB support (IAB-Support IE), which is an information element. The IAB node 300-T then broadcasts the SIB1 including the IAB support.

Then, in step S26, the IAB node 300-T ends a series of processing operations.

On the other hand, in step S22, when the IAB node 300-T determines that an alternative path to the donor node 200 is present (YES in step S22), the processing proceeds to step S25 and the above-described processing is repeated. In this case, since an alternative path is present, the IAB node 300-T broadcasts the SIB1 including the IAB support.

Third Embodiment

Now, a third embodiment will be described.

SR and BSR

A Scheduling Request (SR) and a Buffer Status Report (BSR) according to the third embodiment will be described.

Figure 12A:
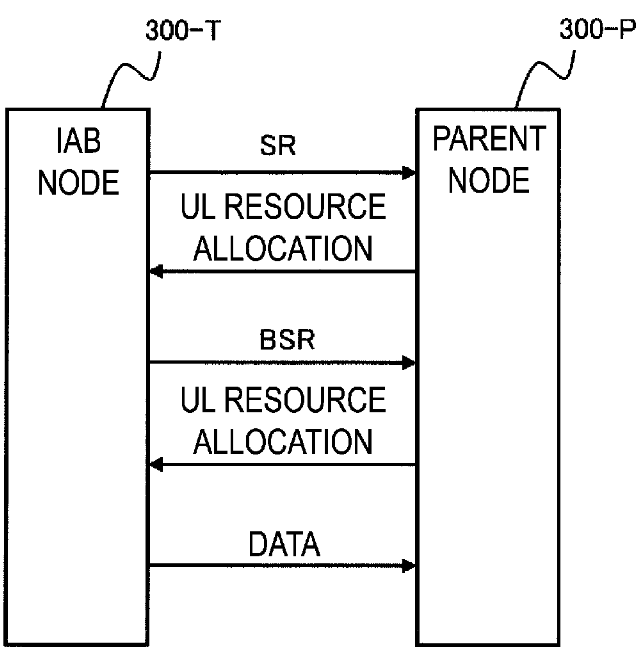
FIG. 12A is a diagram illustrating an example of SR and BSR according to a third embodiment.

FIG. 12A is a diagram illustrating an example of SR and BSR according to the third embodiment. As illustrated in FIG. 12A, the IAB-MT of the IAB node 300-T includes a function of using the BSR to transmit the data amount of the transmission buffer of each logical channel to the IAB-DU of the parent node 300-P. The IAB-DU of the parent node 300-P allocates a radio resource (UL resource) of an uplink radio link, based on the BSR. The IAB-MT of the IAB node 300-T transmits data to the parent node 300-P by using the UL resource.

For the BSR, the IAB node 300-T allocates a Logical Channel Group (LCG) to each logical channel. Then, the IAB node 300-T notifies the parent node 300-P of the transmission buffer amount for each LCG as a BSR. Note that the BSR may be a pre-emptive BSR. While the BSR actually indicates the buffered amount of waiting packets for transmission residing in the IAB node 300-T, the pre-emptive BSR indicates the amount of packets expected to reach the IAB node 300-T (i.e., not actually buffered as waiting packets for transmission yet).

The IAB node 300-T transmits the BSR by using a Physical Uplink Shared Channel (PUSCH). However, if the IAB node 300-T is not allocated with the PUSCH when transmitting the BSR, the IAB node 300-T transmits the SR by using a Physical Uplink Control Channel (PUCCH). When not allocated the PUCCH for transmitting the SR, the IAB node 300-T transmits the SR using a Physical Random Access Channel (PRACH). The parent node 300-P allocates a UL resource to the IAB node 300-T based on the SR, and the IAB node 300-T transmits data using the UL resource.

Note that in the third embodiment, the IAB node 300-T can transmit the BSR and/or the SR by using the PUSCH and the PUCCH.

Communication Control Method According to Third Embodiment

According to the agreement made at the 3GPP RAN2 meeting, the Type2 Indication may be used to trigger deactivation or reduction of the SR and/or BSR.

The deactivation means that transmission is not performed. The above-described agreement indicates that the Type2 Indication may be used to trigger not performing transmission of the SR and/or BSR (or transmission of the SR and/or BSR being not performed). The reduction means that transmission is performed at a predetermined number of times of transmission or less which is smaller than the original number of times of transmission. The above-described agreement indicates that the Type2 Indication may be used to trigger a predetermined number or less of times of transmission of the SR and/or BSR.

Figure 12B:
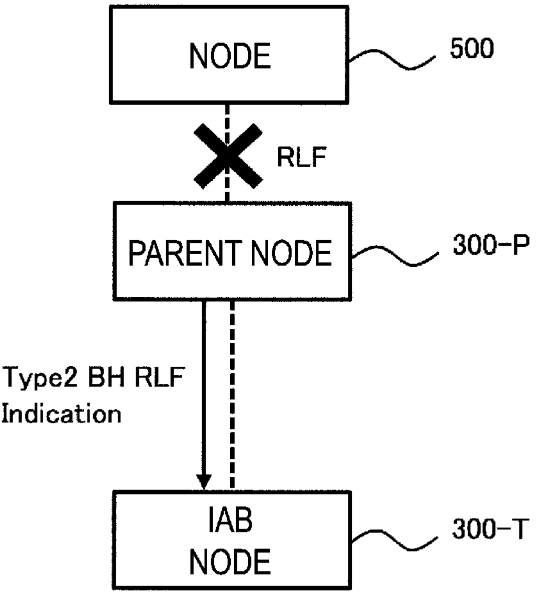
FIG. 12B is a diagram illustrating an example of Type2 Indication according to the third embodiment.

FIG. 12B is a diagram illustrating an example of the Type2 Indication according to the third embodiment. As illustrated in FIG. 12B, the IAB node 300-T is assumed to receive the Type2 Indication from the parent node 300-P. Then, the IAB node 300-T is assumed to transmit the SR or BSR to the parent node 300-P and to be allocated radio resources from the parent node 300-P. In such a case, even when the IAB node 300-T forwards the packet to the parent node 300-P, the parent node 300-P cannot forward the packet to the node 500 because of the occurrence of the RLF, leading to wasteful packet forwarding to the parent node 300-P by the IAB node 300-T, in some cases.

Therefore, when the IAB node 300-T, upon receiving the Type2 Indication, does not perform transmission of the SR and/or BSR or sets the number of times of transmission of the SR and/or BSR to a predetermined number of times of transmission or less, the number of such packet forwarding operation is eliminated or reduced to be smaller than the normal number. Thus, it is effective that the IAB node 300-T, upon receiving the Type2 Indication, does not perform transmission of the SR and/or BSR or sets the number of times of transmission of the SR and/or BSR to a predetermined number of times of transmission or less.

In the case of reduction, the SR and/or the BSR is transmitted a predetermined number of times of transmission or less. However, the number of times of transmission itself is smaller than the original number of times of transmission, allowing interference with other cells to be suppressed. In the case of deactivation, no transmission is performed, allowing interference with other cells to be further suppressed.

On the other hand, in the case of deactivation, even when the BH RLF is eliminated, the parent node 300-P transmits the Type3 Indication to the IAB node 300-T and performs scheduling after receiving the SR and/or the BSR from the IAB node 300-T. This may delay the parent node 300-P compared to a case where the parent node 300-P performs scheduling immediately after the BH RLF is eliminated. On the other hand, the reduction involves lower latency in the parent node 300-P than the deactivation when the parent node 300-P receives the SR and/or the BSR immediately after the BH RLF is eliminated.

In the third embodiment, upon receiving the Type 2 Indication, the IAB node 300-T receives a configuration indicating whether to deactivate or reduce the transmission of the SR, BSR, and/or UL packet. Upon receiving the Type2 Indication, the IAB node 300-T deactivates or reduces the transmission of the SR, BSR, and/or UL packet in accordance with the configuration.

Specifically, first, when a relay node (for example, the IAB node 300-T) receives, from a parent node of the relay node (for example, parent node 300-P), a recovery attempt notification indicating that the parent node is attempting to recover from a failure having occurred in a backhaul link between the parent node and a node (for example, the node 500) that is a further parent node of the parent node, the relay node is configured not to perform predetermined transmission or to perform predetermined transmission a predetermined number of times of transmission or less. Second, in response to reception of the recovery attempt notification, the relay node does not perform predetermined transmission to the parent node or performs the predetermined transmission to the parent node a predetermined number of times of transmission or less in accordance with the configuration. The predetermined transmission refers to transmission of the SR, BSR, and/or UL packet. Hereinafter, transmission of the SR, BSR, and/or UL packet may be referred to as the "predetermined transmission".

As a result, the IAB node 300-T does not perform transmission of packets to the parent node 300-P attempting to recover from the failure or transmits the packet a predetermined number of times of transmission or less, allowing wasteful packet transmission to be suppressed. The IAB node 300-T does not perform the predetermined transmission or performs the predetermined transmission a predetermined number of times of transmission or less, allowing interference with other cells to be suppressed compared to a normal transmission. The configuration of reduction involves lower latency in the IAB node 300-T than the configuration of deactivation.

Figure 13:
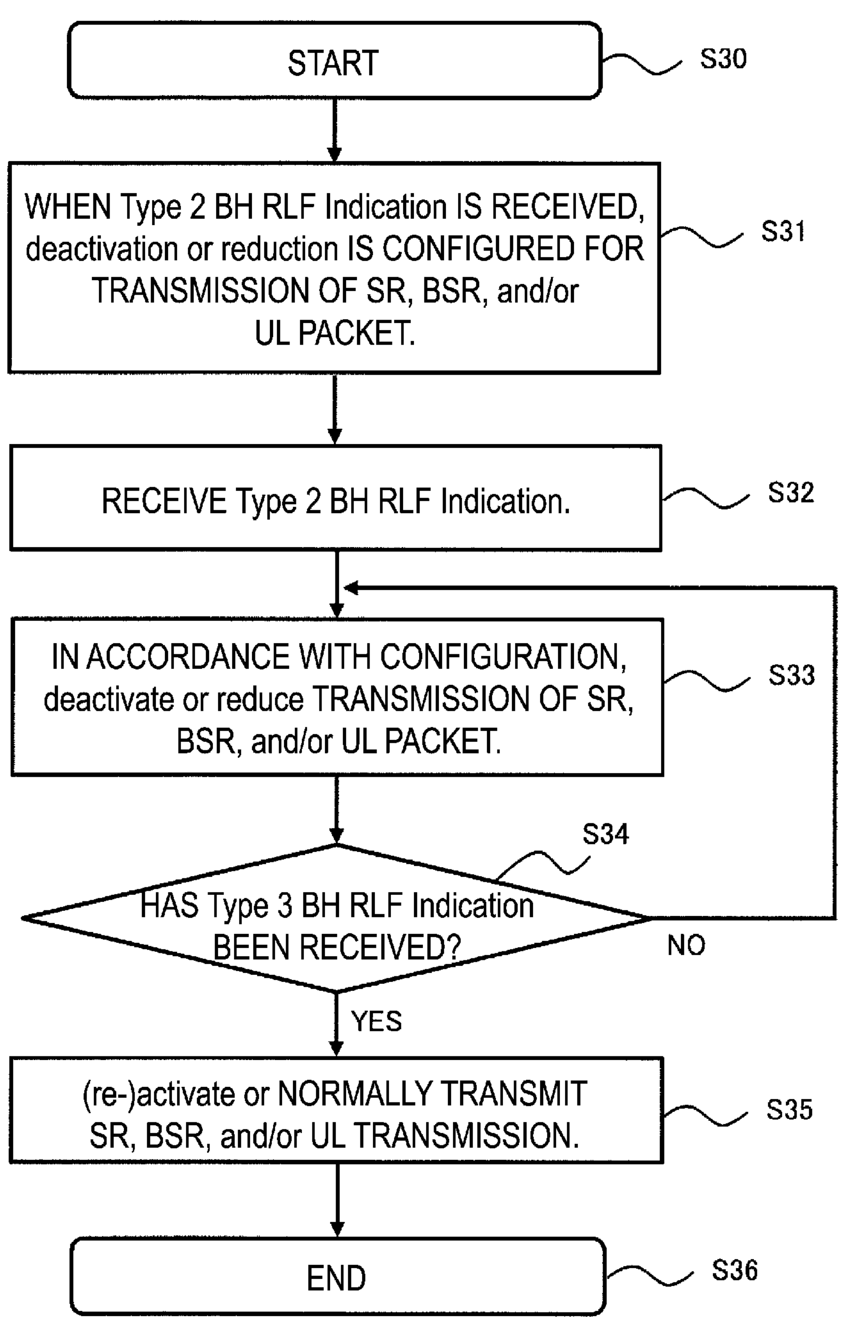
FIG. 13 is a flowchart illustrating an operation example according to the third embodiment.

FIG. 13 is a flowchart illustrating an operation example according to the third embodiment.

The IAB node 300-T starts processing in step S30 as illustrated in FIG. 13.

In step S31, upon receiving the Type2 Indication, the IAB node 300-T is provided with a configuration indicating whether to deactivate or reduce predetermined transmission. First, the configuration may be performed by the donor node 200. In this case, the IAB-CU of the donor node 200 performs the configuration for the IAB-MT of the IAB node 300-T using the RRC message such as the RRC reconfiguration message. Second, the parent node 300-P may perform the configuration. In this case, the IAB-DU of the parent node 300-P performs the configuration for the IAB-MT of the IAB node 300-T by using the MAC CE, the BAP Control PDU, or the like.

In step S32, the IAB node 300-T receives the Type2 Indication from the parent node 300-P.

In step S33, the IAB node 300-T deactivates or reduces predetermined transmission in accordance with the configuration in step S31. In the case of deactivation, the IAB node 300-T may hold the triggered predetermined transmission in a buffer in a pending state. Alternatively, in the case of deactivation, the IAB node 300-T may not trigger the SR, BSR, and/or UL packet.

In step S34, the IAB node 300-T determines whether the IAB node 300-T has received the Type3 Indication from the parent node 300-P.

In step S34, upon determining that the Type3 Indication has not been received (NO in step S34), the IAB node 300-T proceeds to step S33 and repeats the processing in step S33 until the Type3 Indication is received.

On the other hand, in step S34, upon determining that the Type3 Indication has been received (YES in step S34), the IAB node 300-T performs step S35.

In step S35, the IAB node 300-T performs (re-)activation or normal transmission of the predetermined transmission. Normal transmission refers to performing predetermined transmission without reducing the number of times of transmission. In the case of (re-)activation, the IAB node 300-T may read, from the buffer, the SR, BSR, and/or UL packet held in the buffer in the pending state and transmit the read SR, BSR, and/or UL packet. In other words, in response to reception of the Type3 Indication as a trigger, the IAB node 300-T forwards the triggered SR, BSR, and/or UL packet to the lower layer. Alternatively, in the case of (re-)activation, the IAB node 300-T may place the SR, BSR, and/or UL packet in a state in which the SR, BSR, and/or UL packet may be triggered.

Then, in step S36, the IAB node 300-T ends a series of processing operations.

Variation 1 of Third Embodiment

In the example described in the third embodiment, upon receiving the Type2 Indication, the IAB node 300-T executes the reduction to set the number of times of transmission of the predetermined transmission to the predetermined number of times of transmission or less. In contrast, Variation 1 illustrates an example in which the reduction is implemented using a prohibit timer.

Specifically, first, a relay node (e.g., IAB node 300-T) receives a configuration of a prohibit timer value. Second, when the relay node receives the recovery attempt notification and performs the predetermined transmission the predetermined number of times of transmission or less, the relay node does not perform the predetermined transmission until the prohibit timer value expires and performs the predetermined transmission when the prohibit timer value expires. Thus, after receiving the recovery attempt notification, the relay node can perform the predetermined transmission the predetermined number of times of transmission or less.

Figure 14:
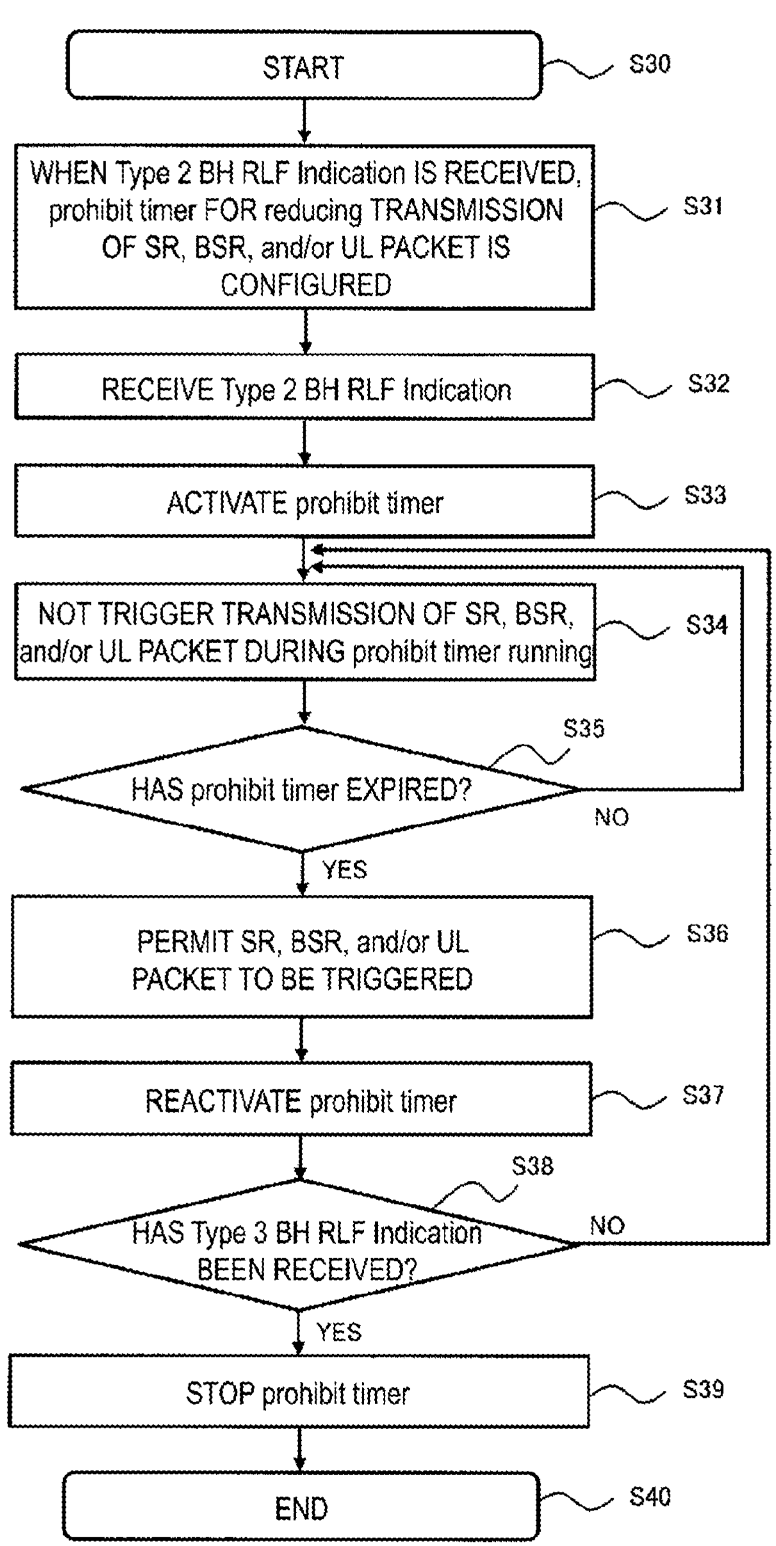
FIG. 14 is a flowchart illustrating an operation example according to Variation 1 of the third embodiment.

FIG. 14 is a flowchart illustrating an operation example according to Variation 1 of the third embodiment.

The IAB node 300-T starts processing in step S30 as illustrated in FIG. 14.

In step S31, upon reception of the Type2 Indication, the IAB node 300-T is configured with a prohibit timer value for reducing predetermined transmission. First, the prohibit timer value may be configured by the donor node 200. In this case, the donor node 200 may perform the configuration by transmitting an RRC message such as an RRC reconfiguration message to the IAB node 300-T. Second, the parent node 300-P may configure the prohibit timer value. In this case, the parent node 300-P may perform the configuration by transmitting the MAC CE, the BAP Control PDU, or the like to the IAB node 300-T.

In step S32, the IAB node 300-T receives the Type2 Indication.

In step S33, the IAB node 300-T activates the prohibit timer.

In step S34, the IAB node 300-T does not trigger the SR, BSR, and/or UL packet while the prohibit timer is running. Alternatively, the IAB node 300-T may make transmission of the SR, BSR, and/or UL packet pending. In this case, the IAB node 300-T may hold the pending SR, BSR, and/or UL packet in the buffer.

In step S35, the IAB node 300-T determines whether the prohibit timer has expired. Whether the prohibit timer has expired is determined based on whether the prohibit timer has reached the prohibit timer value.

In step S35, when the IAB node 300-T determines that the prohibit timer has not expired (NO in step S35), the process proceeds to step S34 and the processing of step S34 is repeated until the prohibit timer expires.

On the other hand, in step S35, upon determining that the prohibit timer has expired (YES in step S35), the IAB node 300-T performs processing in step S36.

In step S36, the IAB node 300-T allows triggering of the SR, BSR, and/or UL packet. In this case, the IAB node 300-T is permitted to perform predetermined transmission, and performs the predetermined transmission (at predetermined timing). The IAB node 300-T may transmit the pending SR, BSR, and/or UL packet (at a predetermined timing).

In step S37, the IAB node 300-T reactivates the prohibit timer. The IAB node 300-T may reactivate the prohibit timer at the timing when the prohibit timer expires, or may reactivate the prohibit timer when the predetermined transmission is performed.

In step S38, the IAB node 300-T determines whether the IAB node 300-T has received the Type3 Indication from the parent node 300-P. In step S38, upon determining that the Type3 Indication has not been received (NO in step S38), the IAB node 300-T proceeds the processing to step S34 and repeats the above-described processing.

On the other hand, in step S38, upon determining that the Type3 Indication has been received (YES in step S38), the IAB node 300-T performs processing in step S39.

In step S39, the IAB node 300-T stops the prohibit timer.

Then, in step S40, the IAB node 300-T ends a series of processing operations.

In Variation 1, when the IAB node 300-T receives the Type2 Indication, the IAB node 300-T activates the prohibit timer, does not transmit the SR, BSR, and/or UL packet while the prohibit timer is active, and performs the predetermined transmission when the prohibit timer expires. Thus, after receiving the Type2 Indication, the IAB node 300-T can reduce the number of times of transmission of the predetermined transmission, achieving the reduction of the predetermined transmission.

Variation 2 of Third Embodiment

In the example described in Variation 1 of the third embodiment, after reception of the Type2 Indication, the prohibit timer is used to achieve the reduction of the predetermined transmission. In contrast, in an example in Variation 2 of the third embodiment, after reception of the Type2 Indication, a counter is used to achieve the reduction of the predetermined transmission.

Specifically, first, the relay node (for example, the IAB node 300-T) receives a configuration of a counter value. Second, when the relay node receives the recovery attempt notification and performs the predetermined transmission the predetermined number of times of transmission or less, the relay node does not perform the predetermined transmission until a transmission opportunity for the predetermined transmission reaches a counter threshold value, and performs the predetermined transmission when the transmission opportunity reaches the counter threshold value. Thus, after receiving the recovery attempt notification, the relay node can perform the predetermined transmission the predetermined number of times of transmission or less.

Figure 15:
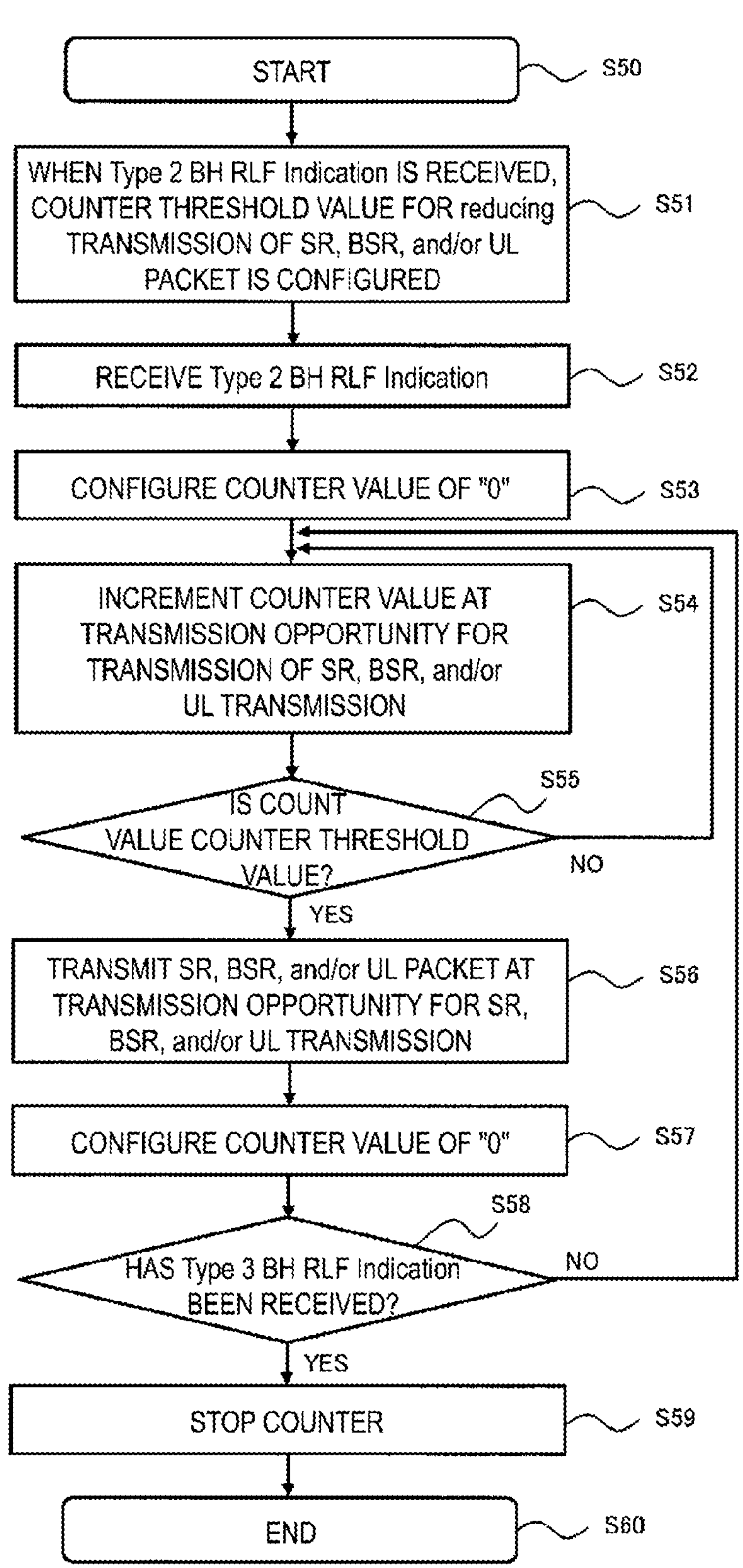
FIG. 15 is a flowchart illustrating an operation example according to Variation 2 of the third embodiment.

FIG. 15 is a flowchart illustrating an operation example according to Variation 2 of the third embodiment.

The IAB node 300-T starts processing in step S50 as illustrated in FIG. 15.

In step S51, upon receiving the Type2 Indication, the IAB node 300-T configures the counter threshold value for reducing the predetermined transmission. First, the counter threshold value may be configured by the donor node 200. In this case, the donor node 200 may configure the IAB node 300-T using the RRC message such as the RRC reconfiguration message. Second, the parent node 300-P may configure the counter threshold value. In this case, the parent node 300-P may configure the IAB node 300-T using the MAC CE, the BAP Control PDU, or the like.

In step S52, the IAB node 300-T receives the Type2 Indication from the parent node 300-P.

In step S53, the IAB node 300-T configures the counter with a counter value of "0".

In step S54, the IAB node 300-T increments the counter value at an opportunity of transmitting the SR, BSR, and/or UL packet. In other words, the IAB node 300-T increments the counter value without performing transmission even when a transmission opportunity for the SR, BSR, and/or UL packets arrives.

The transmission opportunity for the SR is a predetermined timing for the PUCCH. The transmission opportunity for the BSR is a predetermined timing for the PUSCH. The transmission opportunity for the UL packets is a predetermined timing for the PUSCH.

In step S55, the IAB node 300-T determines whether the counter value has reached a counter threshold value. In step S55, upon determining that the counter value has not reached the counter threshold value (NO in step S55), the IAB node 300-T repeats the processing in step S54 until the counter value reaches the counter threshold value.

On the other hand, in step S55, upon determining that the counter value has reached the counter threshold value (YES in step S55), the IAB node 300-T executes processing in step S56.

In step S56, the IAB node 300-T performs predetermined transmission at a transmission opportunity for the predetermined transmission.

In step S57, the IAB node 300-T configures a counter value of "0". For example, the IAB node 300-T may configure a counter value of "0" when the counter value reaches the counter threshold value, or may configure a counter value of "0" when the IAB node 300-T performs the predetermined transmission.

In step S58, the IAB node 300-T determines whether the IAB node 300-T has received the Type3 Indication from the parent node 300-P. In step S58, when the IAB node 300-T determines that the Type3 Indication has not been received from the parent node 300-P (NO in step S58), the processing proceeds to step S54 and the above-described processing is repeated.

On the other hand, in step S58, upon determining that the IAB node 300-T has received the Type3 Indication from the parent node 300-P (YES in step S58), the IAB node 300-T executes processing in step S59.

In step S59, the IAB node 300-T stops the counting operation of the counter.

Then, in step S60, the IAB node 300-T ends a series of processing operations. In Variation 2, upon receiving the Type2 Indication, the IAB node 300-T performs counting using the counter without performing transmission at the transmission opportunity for the SR, BSR, and/or UL packet, and the IAB node 300-T performs transmission at the transmission opportunity for the predetermined transmission when the counter value reaches the counter threshold value. Thus, after receiving the Type2 Indication, the IAB node 300-T can reduce the number of times of transmission of the predetermined transmission, achieving the reduction of the predetermined transmission.

Variation 3 of Third Embodiment

In the third embodiment, the reduction has been described that sets the number of times of transmission of the SR and/or BSR to a predetermined number of times of transmission or less when the Type2 Indication is received. On the other hand, Variation 3 of the third embodiment is an example in which the parent node 300-P that has transmitted the Type2 Indication does not transmit a UL grant to the child node (IAB node 300-T) when receiving the SR and/or the BSR based on the reduction from the child node.

Specifically, first, when a relay node (for example, the IAB node 300-T) receives a recovery attempt notification from a parent node (for example, the parent node 300-P), the relay node is configured not to perform predetermined transmission or to perform the predetermined transmission a predetermined number of times of transmission or less. Second, in response to reception of the recovery attempt notification, the relay node performs the predetermined transmission the predetermined number of times of transmission or less in accordance with the configuration. Third, the parent node does not transmit a UL grant to the relay node in response to receiving a scheduling request and/or a buffer status report the predetermined number of times of transmission or less.

Thus, the relay node does not forward the packet to the parent node attempting to recover from the BH RLF, and can perform appropriate transmission.

Figure 16:
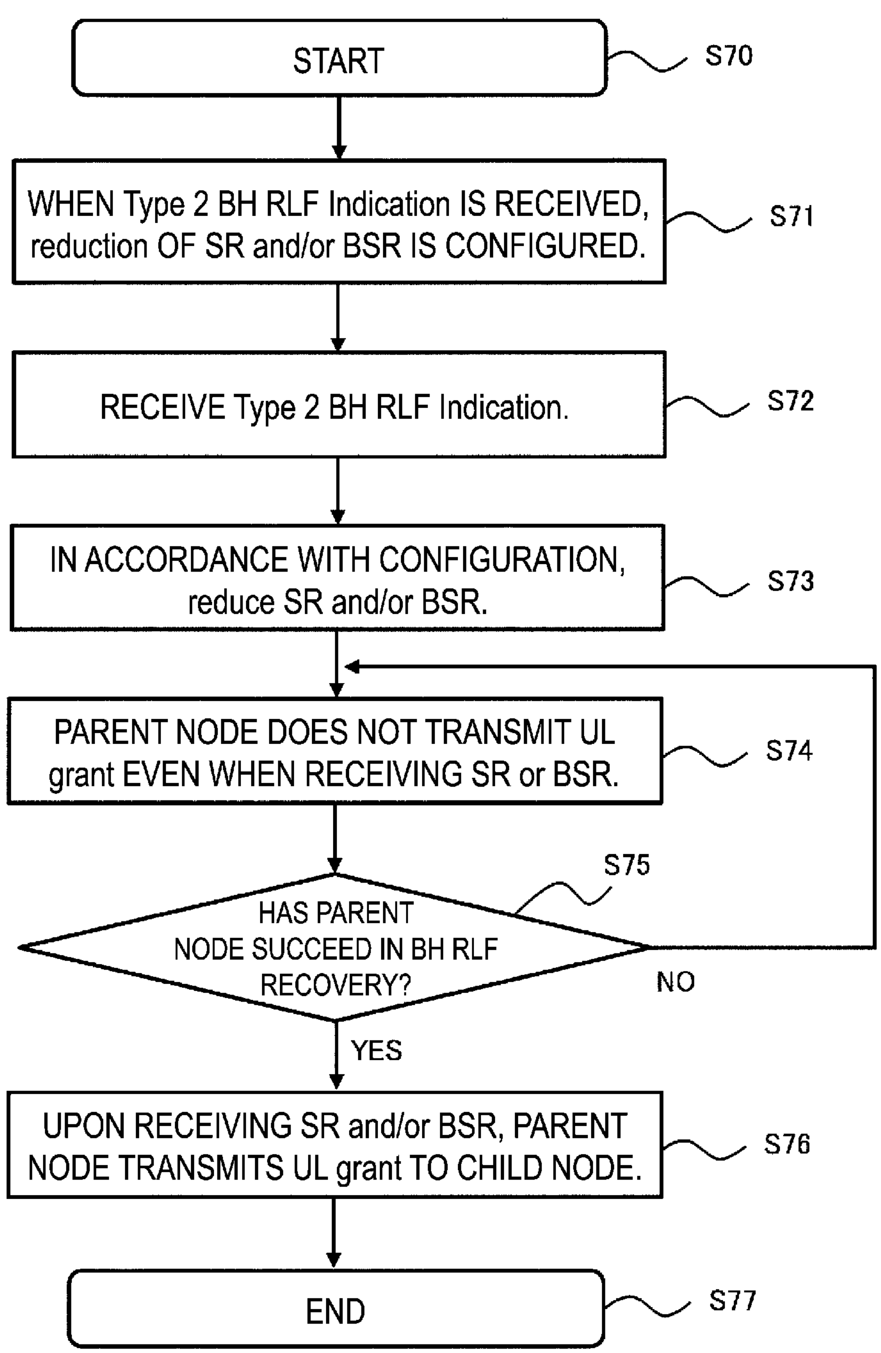
FIG. 16 is a flowchart illustrating an operation example according to Variation 3 of the third embodiment.

FIG. 16 is a flowchart illustrating an operation example according to Variation 3 of the third embodiment.

The IAB node 300-T starts processing in step S70 as illustrated in FIG. 16.

In step S71, upon receiving the Type2 Indication, the IAB node 300-T is configured with reduction of transmission of the SR and/or BSR. The configuration itself may be performed by the donor node 200 or by the parent node 300-P as in the third embodiment.

In step S72, the IAB node 300-T receives the Type2 Indication from the parent node 300-P.

At step S73, the IAB node 300-T reduces the transmission of the SR and/or BSR in accordance with the configuration.

In step S74, even when receiving the SR and/or the BSR, the parent node 300-P does not transmit the UL grant to the child node (the IAB node 300-T) that has transmitted the SR and/or the BSR.

In step S75, the parent node 300-P determines whether the BH RLF recovery is successful. For example, the parent node 300-P may execute cell selection processing on a node on the BH link in which the BH RLF has occurred and determine whether a cell for the node is found that satisfies the minimum radio quality. Upon determining that the BH RLF recovery is not successful (NO in step S75), the parent node 300-P repeats the processing in step S74 until the BH RLF recovery is successful.

On the other hand, upon determining that the BH RLF recovery is successful (YES in step S75), the parent node 300-P executes processing in step S76.

In step S76, upon receiving the SR and/or the BSR, the parent node 300-P transmits the UL grant to the child node (IAB node 300-T). Note that the parent node 300-P may transmit the Type3 Indication and then the UL grant to the child node.

Then, in step S77, the parent node 300-P ends a series of processing operations.

Other Variations

In the example described in Variation 3 of the third embodiment, after transmitting the Type2 Indication to the child node (the IAB node 300-T), the parent node 300-P does not transmit the UL grant to the child node even when receiving the SR and/or the BSR from the child node. For example, the parent node 300-P may perform control not to perform transmission of the UL grant to the child node (IAB node 300-T) even when receiving the SR and/or the BSR from the child node after detecting the BH RLF or during the recovery processing regardless of the BH RLF Indication.

Fourth Embodiment

Now, a fourth embodiment will be described.

In an example in the fourth embodiment, upon receiving the Type2 Indication, the IAB node 300-T transmits, to the donor node 200 via the parent node 300-P2, a notification indicating that the Type2 Indication has been received from the parent node 300-P1.

Figure 17:
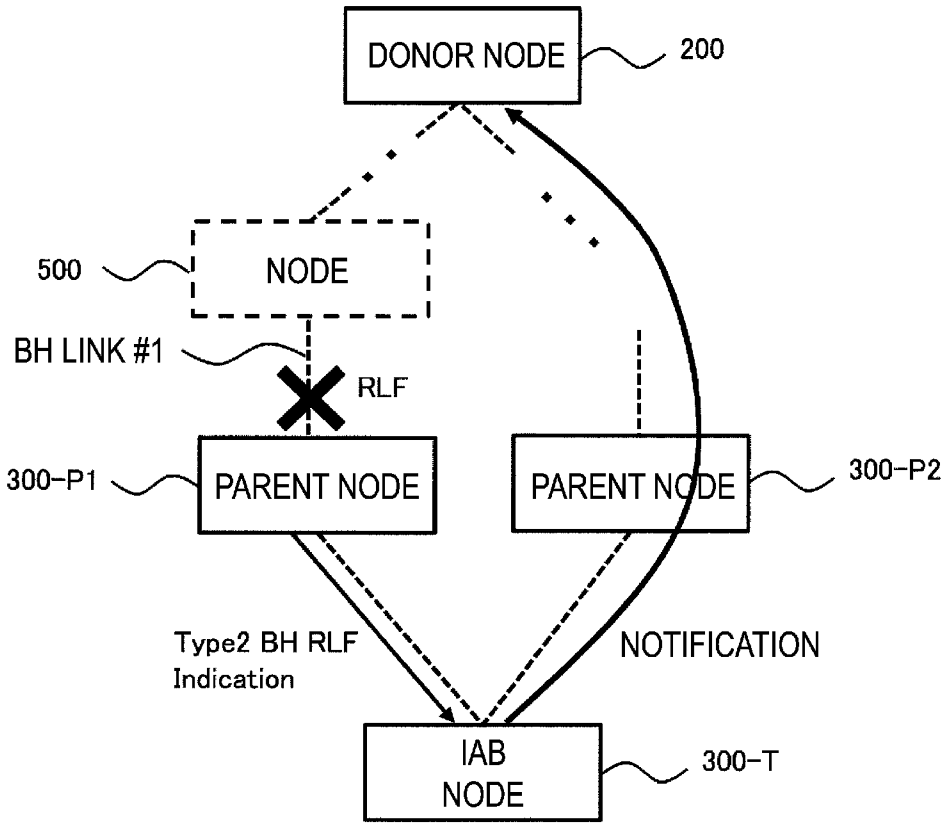
FIG. 17 is a diagram illustrating a configuration example of an IAB network according to a fourth embodiment.

FIG. 17 is a diagram illustrating a configuration example of an IAB network according to the fourth embodiment.

In the IAB network, the donor node 200 performs centralized management on resources, topology, routes, and the like of the IAB topology, as described above. For example, as illustrated in FIG. 17, an RLF is assumed to occur in the BH link #1 between the parent node 300-P1 and the node 500 being a parent node of the parent node 300-P1, and the parent node 300-P1 is attempting to recover from the BH RLF. In such a case, when being able to determine such a situation of the IAB nodes, the donor node 200 can centrally manage the entire IAB nodes 300 provided as lower nodes.

However, when the IAB node 300-T receives the Type2 Indication from the parent node 300-P1, even when the IAB node 300-T notifies the parent node 300-P1 of the reception, the notification does not reach the donor node 200 because the RLF is occurring in the BH link #1.

On the other hand, for example, in the IAB node 300-T, DC configuration is assumed to provide two paths for the parent node 300-P1 and the parent node 300-P2. In this case, the IAB node 300-T may transmit the notification to the donor node 200 via the parent node 300-P2.

In other words, in the fourth embodiment, first, a relay node (for example, the IAB node 300-T) receives, from a first parent node (for example, the parent node 300-P1) of the relay node, a recovery attempt notification indicating that the first parent node is attempting to recover from a failure having occurred in a backhaul link between the first parent node and a node (for example, the node 500) that is a further parent node of the first parent node. Second, in response to receiving the recovery attempt notification, the relay node transmits the reception of the recovery attempt notification from the first parent node to the donor node via a second parent node that is the parent node of the relay node. This enables the relay node to transmit the reception of the recovery attempt notification from the first parent node to the donor node via the second parent node. This enables contribution to centralized management by the donor node.

Figure 18:
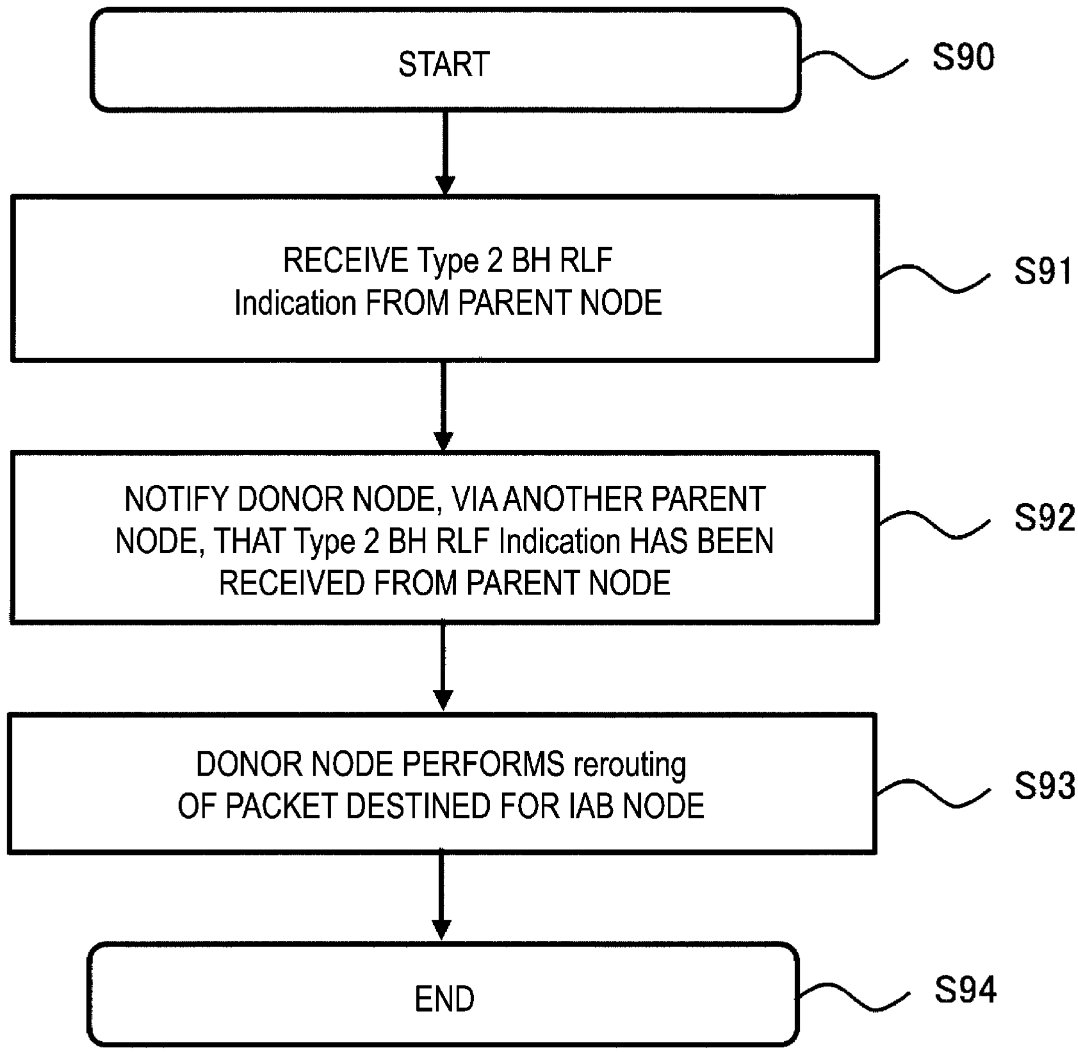
FIG. 18 is a flowchart illustrating an operation example according to the fourth embodiment.

FIG. 18 is a flowchart illustrating an operation example according to the fourth embodiment. Note that in the operation example illustrated in FIG. 18, the IAB node 300-T is assumed to be configured with dual connectivity (DC). For example, the CU of the donor node 200 is assumed to configure the parent node 300-P1 with a Master Cell Group (MCG) and configure the parent node 300-P2 with a Secondary Cell Group (SCG) for the IAB-MT of the IAB node 300-T by using the RRC message (for example, the RRC reconfiguration message).

The IAB node 300-T starts processing in step S90 as illustrated in FIG. 18.

In step S91, the IAB node 300-T receives the Type2 Indication from the parent node 300-P1. At this time, as in the first embodiment, the IAB node 300-T may determine to perform local rerouting to the parent node 300-P2, different from the parent node 300-P1 (with respect to packet forwarding in the upstream direction).

In step S92, the IAB node 300-T transmits, to the donor node 200 via such another parent node 300-P2, a notification indicating that the Type2 Indication has been received from the parent node 300-P1. Instead of (or in addition to) receiving the Type2 Indication from the parent node 300-P1, the notification may indicate that local rerouting has been determined to be performed (for packet forwarding in the upstream direction). The notification may include the following.

A1) Routing ID (or path ID) used before local rerouting: For example, the routing ID is a routing ID, which is configured by the donor node 200 for the TAB node 300-T before the JAB node 300-T determines to perform the local rerouting.

A2) Routing ID (or path ID) used after the local rerouting: For example, the routing ID is a routing ID, which is configured by the JAB node 300-T after the JAB node 300-T determines to perform the local rerouting. The routing ID includes the BAP address and/or path ID of the parent node 300-P2 or the donor node. The JAB node 300-T itself generates a routing ID for which the parent node 300-T corresponds to the destination BAP address, and includes the routing ID in the notification. Alternatively, the donor node 200 may configure an alternative path (or alternative routing ID) for the JAB node 300-T, and the JAB node 300-T may select a routing ID illustrated in A2), from the configured alternative path.

A3) The cell ID (or gNB ID or BAP address) of the parent node 300-P1 having transmitted the Type2 Indication: For example, upon receiving a packet including the Type2 Indication, the JAB node 300-T acquires the cell ID included in the transmission source of the packet, and includes the cell ID in the notification.

A4) The cell ID (or gNB ID or BAP address) of the parent node 300-P2 corresponding to the local rerouting destination: For example, when DC is configured, the JAB node 300-T acquires, using the RRC message or the like, the cell ID of the parent node 300-P2 including the SCG, and this cell ID is available.

A5) Cause information (Cause) indicating that "the local rerouting is based on the reception of the Type2 Indication" The notification may include all or some of A1) to A5) described above. The notification may be transmitted by the IAB-MT of the JAB node 300-T transmitting the RRC message including the notification to the CU of the donor node 200 via the parent node 300-P2.

In step S93, the donor node 200 reroutes packets destined for the JAB node 300-T. For example, the donor node 200 causes transmission of a packet addressed to the JAB node 300-T or a packet transmitted in the downstream direction via the JAB node 300-T in such a manner that the packets are transmitted via the alternative path routed through the parent node 300-P2.

Then, in step S94, the JAB node 300-T ends a series of processing operations.

Note that in response to reception of the Type3 Indication from the parent node 300-P1, the JAB node 300-T may transmit, to the donor node 200, a notification indicating that the Type3 Indication has been received from the parent node 300-P1. Alternatively, a notification indicating that the local rerouting is stopped may be transmitted. In this case, the JAB node 300-T may transmit the notification to the donor node 200 via the parent node 300-P1 or may transmit the notification to the donor node via the parent node 300-P2.

Other Embodiments

A program causing a computer to execute each type of processing performed by the UE 100, the gNB 200, or the IAB node 300 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing each type of processing to be performed by the UE 100, the gNB 200, or the IAB node 300 may be integrated, and at least part of the UE 100, the gNB 200, or the IAB node 300 may be configured as a semiconductor integrated circuit (a chipset or a System-on-a-chip (SoC)).

Although embodiments have been described in detail with reference to the drawings, a specific configuration is not limited to those described above, and various design modifications and the like can be made without departing from the scope of the present disclosure. All of or a part of the embodiments can be combined together as long as no inconsistencies are introduced.

Supplementary Note

Introduction

The revised work item for integrated access and backhaul enhancements (eIAB) in NR was approved at RAN #88e. Some of the purposes thereof are as follows.

Enhancements of Topology Adaptation:

- Specification of a procedure for inter-donor IAB-node migration to enhance robustness and load balancing, including enhancements to reduce signaling load.

Specification of enhancements to reduce service interruption due to IAB-node migration and BH RLF recovery.

Specification of enhancements of topology redundancy, including support for CP/UP separation.

Enhancements of Topology, Routing, and Transport:

Specification of enhancements to improve topology-wide fairness, multi-hop latency, and congestion mitigation.

RAN2 discusses the conditional handover, and RAN3 will start discussion on conditional handover among the donors, for which the discussion has developed to migration of the IAB node between the donors.

RAN2 confirms the intention that the Rel-16 conditional handover is/can be used for the IAB-MT (whether a change is required needs further studies).

RAN2 assumes that the Rel-16 specifications are the baseline for configurations of a default route, IP addresses, and a target path for intra-donor conditional handover.

RAN2 supports the Type2/3 RLF Indication (details need further studies).

The Type2 RLF Indication can be used to trigger local rerouting.

The Type2 RLF Indication can be used to trigger deactivation of IAB supported by SIBs.

The Type2 RLF Indication can be used to trigger deactivation or reduction of SR and/or BSR transmission.

Local rerouting can be triggered by indicating per-hop flow control. Details such as trigger information, trigger conditions, and the role of CU configuration need further studies.

RAN2 considers the local rerouting of inter-donor DUs to be within a certain range.

The supplementary note describes various topics of the topology adaptation enhancements of Rel-17 eIAB. Specifically, the supplementary note describes enhancement of BH RLF Indication, enhancement of conditional handover, enhancement of local rerouting, and some other enhancements.

Discussion

Enhancement of BH RLF Indication

In Rel-16 email discussion, four types of BH RLF notifications were discussed as illustrated in FIG. 19.

Finally, only Type4 "recovery failure" was defined as the BH RLF Indication in Rel-16. Thus, the child IAB-MT can recognize an RLF on the BH link of the parent node and start the RLF recovery procedure.

Finding 1: Only Type4 "recovery failure" was defined as the BH RLF Indication in Rel-16.

For enhancements in Rel-17, RAN2 agreed to introduce Type2 "attempting to recover" and Type3 "BH link recovered".

RAN2 supports the Type2/3 RLF Indication (details need further studies).

The Type2 RLF Indication can be used to trigger local rerouting.

The Type2 RLF Indication can be used to trigger deactivation of IAB supported by SIBs.

The Type2 RLF Indication can be used to trigger deactivation or reduction of SR and/or BSR transmission.

One of the topics to be discussed is whether/how to define operations, but RAN2 has already agreed to three possible use cases of the new BH RLF Indication.

For triggering of local rerouting, from the point of view of the IAB node receiving the Type2 BH RLF Indication, a BH RLF occurs in the UL, and can thus be regarded as triggering upstream local rerouting, i.e., switching of the UL path. In other words, the IAB node receiving the Type2 BH RLF Indication can maintain a good BH link with downstream nodes, downstream local rerouting is independent of the Type2 BH RLF Indication. Therefore, the triggering of local rerouting can be regarded as an operation of the IAB-MT that needs to be clearly defined.

Proposal 1: RAN2 needs to agree to specify that upon receiving the Type2 BH RLF Indication from the parent node, the IAB-MT triggers local rerouting on the upstream path.

Proposal 2: RAN2 needs to agree to specify that upon receiving the Type3 BH RLF Indication from the parent node, the IAB-MT stops the local rerouting on the upstream path, i.e., returns to the configured "normal" routing.

The deactivation of the IAB-Support IE in the SIB1 can be regarded as an operation of the IAB-DU until Rel-16 is widely implemented. Therefore, definition only at stage 2 is probably sufficient. For details of operations, the IAB-DU is assumed possibly not to remove the IAB-Support IE from the SIB1 when an alternative path to the donor is still present. This needs to be clarified when operations are defined.

Proposal 3: RAN2 needs to study whether to remove the IAB-Support IE from the SIB1 when the IAB-DU receives the Type2 BH RLF Indication only at stage 2 and no alternative path to the IAB donor is present.

According to the RAN2 agreement described above, regardless of Proposal 3, the IAB-MT does not start establishing connection to the parent node when the IAB-Support IE is not present in the SIB1. One question is whether the UE is allowed access to the cell (parent node) even while the parent node is in a BH RLF state. This has a negative impact on the user because the RRC setup request cannot reach the CU, i.e., the donor. To avoid this, the cell may perform one of, for example, prohibition of UE access, turn-off of SSB, or broadcast of the Type2 BH RLF Indication via SIB1. As in Proposal 3, when the IAB node includes an alternative path to the donor, the IAB support IE need not be removed from the SIB1.

Proposal 4: RAN2 needs to study whether to prohibit UE access in addition to IAB-MT access when the IAB-DU receives the Type2 BH RLF Indication and no alternative path to the IAB donor is present.

Deactivation or reduction of the SR and/or BSR transmission may be considered as an operation of the IAB-MT and thus needs to be clearly defined. For the deactivation or reduction, the "deactivation" may be simpler from a standpoint of specifications. However, the SR and/or BSR can be transmitted only after reception of Type3, leading to a possible delay in scheduling. On the other hand, the "reduction" may allow scheduling to be resumed immediately after the BH link is recovered. However, unwanted interference occurs. Therefore, RAN2 needs to discuss whether to support the "deactivation" or "reduction" of the SR and/or BSR or both "deactivation" and "reduction". When both are supported, this needs to be configurable by the IAB donor. When the "reduction" is supported, a method for reducing the SR and/or BSR is unclear. The concept of the prohibit timer may be reused, but further studies are needed at this time.

Proposal 5: RAN2 needs to agree to specify that upon receiving the Type2 BH RLF Indication from the parent node, the IAB-MT deactivates or reduces the SR and/or BSR transmission.

Proposal 6: RAN2 needs to agree to specify that upon receiving the Type3 BH RLF Indication from the parent node, the IAB-MT can resume the normal procedure of SR and/or BSR transmission.

Proposal 7: RAN2 needs to study whether to support "deactivation" or "reduction" or both "deactivation" and "reduction" (i.e., configurable) of the SR and/or BSR when the Type2 BH RLF Indication is received from the parent node.

Similarly to the Type4 BH RLF Indication in Rel-16, the Type2 and Type3 BH RLF Indications are considered to be easily transmitted via the BAP control PDU. However, in relation to Proposal 3 described above, the UE includes no BAP layer and thus cannot receive the BAP control PDU. Therefore, these BH RLF Indications may be broadcast via the SIB1, and the SIB1 may be encoded by the DU. Therefore, RAN2 needs to study which of the BAP control PDU or the SIB1 the BH RLF Indications are transmitted via.

Proposal 8: RAN2 needs to discuss which of the BAP control PDU or the SIB1 the Type2 and Type3 BH RLF Indications are transmitted via.

Enhancements for Conditional Handover

The conditional handover was introduced in Rel-16 to improve mobility robustness. In our understanding, the conditional handover can be used for the defined Rel-16 IAB. RAN2 #113-e reached the following agreement. Therefore, it is worth considering enhancements for the eIAB conditional handover in addition to the Rel-16 conditional handover.

RAN2 discusses the conditional handover, and RAN3 will start discussion on conditional handover among the donors, for which the discussion has developed to migration of the IAB node between the donors.

RAN2 confirms the intention that the Rel-16 conditional handover is/can be used for the IAB-MT (whether a change is required needs further studies).

RAN2 assumes that the Rel-16 specifications are the baseline for configurations of a default route, IP addresses, and a target path for intra-donor conditional handover.

The conditional handover in Rel-16 is performed when the corresponding conditional handover event (A3/A5) is satisfied or when a selected cell is a candidate for the conditional handover as a result of cell selection for RRC reestablishment.

The following principles apply to the conditional handover:

The configuration of the conditional handover includes a configuration of a candidate cell for the conditional handover generated by a candidate gNB and an execution condition generated by the source gNB.

The execution condition is configured with one or two trigger conditions (conditional handover event A3/A5). Only a single RS Type is supported, and up to two different trigger amounts (such as RSRP and RSRQ, RSRP and SINR, or the like) can be configured at the same time to evaluate the execution condition for the conditional handover for a single candidate cell. After an RLF is declared, the UE performs the following:

Remains in the RRC connected state.

For the conditional handover, in the case of an RLF in the source cell:

Selects an appropriate cell, and when the selected cell is a candidate for the conditional handover, and the network configures the UE in such a manner that the UE attempts the conditional handover after the RLF, the UE attempts to perform the conditional handover once.

Otherwise, reestablishment is performed.

When no appropriate cell is found within a certain period of time since the RLF declaration, enters the RRC idle state.

The conditional handover event A3/A5 can be satisfied when the IAB node experiences a BH RLF on the BH link. On the other hand, the BH link of the IAB node itself is in a good radio state, and thus the trigger conditions cannot be satisfied by an IAB-specific RLF, i.e., an RLF due to reception of the BH RLF Indication (Type4). In this case, one desirable operation is to perform the conditional handover when the IAB node receives the BH RLF Indication.

Finding 2: Since the BH link between the IAB-MT and the parent node still remains, the conditional handover in Rel-16 is not automatically triggered/performed by the conditional handover event A3/A5 at the IAB-MT even when the recovery of the parent node from the BH RLF is in progress and fails.

Therefore, in order to improve the topology adaptation of Rel-17 eIAB, it is worth discussing additional trigger conditions for the conditional handover. At least the existing BH RLF Indication (i.e., Type4) is considered to be a promising candidate for a new trigger, but when Type4 is introduced, whether the conditional handover also needs to be performed upon reception of the Type2 Indication can further be discussed.

Proposal 9: RAN2 needs to discuss whether any additional trigger condition is defined for the conditional handover, i.e., discuss when at least the case where the IAB node receives the BH RLF Indication (Type4). When this is introduced, applicability to Type2 needs further studies.

When Proposal 9 is convincing, the trigger does not depend on the conditional handover event A3/A5 but is a type of forced trigger based on the BH RLF Indication, and thus, all conditional handover candidates (i.e., candidate cells) may be able to trigger the conditional handover at the same time.

According to the current specification, "when a plurality of NR cells is triggered by execution of conditional reconfiguration, which NR cell is to be selected depends on the implementation of the UE. For example, the UE considers beams and beam quality to select one of the triggered cells for execution". This is mainly intended for the UE.

Finding 3: In the Rel-16 conditional handover, when a plurality of candidate cells triggers execution of the conditional handover, which cell is to be selected depends on the implementation of the UE.

For the IAB-MT, the topology-wide goals may be effectively addressed by the IAB donor described by RAN2 #112-e, and thus it is not always the best approach for the IAB-MT to select one of the cells triggered by an implementation depending on local radio quality. Therefore, RAN2 needs to study how execution of the conditional handover controlled by the IAB donor using an additional trigger condition functions as in Proposal 9. For example, the IAB donor can configure priority information associated with candidates for the conditional handover in the configuration of the conditional handover. The IAB-MT needs to select the highest priority cell from all candidates for the triggered conditional handover that satisfy a certain radio quality (e.g., S criterion).

Proposal 10: RAN2 should study whether the conditional handover controlled by the IAB donor as an additional enhancement needs to be executed when reception of the BH RLF Indication causes all candidate cells to trigger the conditional handover.

Enhancement of Local Rerouting

Rel-16 permits local rerouting only when a BH RLF occurs.

NOTE: for example, data buffering in a transmission part of a BAP entity is up to the implementation until an RLC-AM entity receives an acknowledgment response. In the case of a BH RLF, the transmission part of the BAP entity can reroute, to the alternative path, the BAP data PDU unacknowledged by the lower layers before the BH RLF.

RAN2 #113-e has achieved the following agreements relating to enhanced local rerouting.

- The Type2 RLF Indication can be used to trigger local rerouting.
- Local rerouting can be triggered by indicating per-hop flow control. Details such as trigger information, trigger conditions, and the role of CU configuration need further studies.
- RAN2 considers the inter-donor DU local rerouting to be within a certain range.

However, the details of local rerouting are still unclear, at least from a standpoint of configuration. As agreed in RAN2 #112-e, for other cases of Rel-17 (i.e., not limited to the BH RLF), "RAN2 discusses how RAN2 can address, in connection with local rerouting, topology-wide goals including advantages for the determination of a central route". Therefore, the problem with Rel-16 needs to be considered from an objective standpoint of the whole topology. Needless to say, the IAB donor is an entity that has complete knowledge about and complete control over the IAB topology and thus addresses the topology-wide objectives.

Finding 4: The IAB donor is the most appropriate entity to achieve the topology-wide objectives.

In the Rel-16 local rerouting, which path is selected as an alternative path depends on the implementation of the IAB node as long as the destination is the same. This means that local rerouting is based on local determinations and cannot be controlled from a viewpoint of the IAB donor. This may not be consistent with the topology-wide objectives, especially when many local determinations occur and accumulate in the IAB topology.

Finding 5: In the Rel-16 local rerouting, which path is selected as the alternative path depends on the implementation of the IAB-MT.

Thus, when local rerouting is enhanced beyond a BH RLF case, the controllability of the IAB donor should become more important. The IAB donor can easily configure an alternative path. Thus, the IAB node needs to select an alternative path when performing local rerouting. Modeling of the alternative path needs further studies. For example, whether alternative paths have the same routing ID and the like need to be studied.

Proposal 11: RAN2 needs to study whether the IAB donor can provide a configuration of the IAB node using an alternative path in addition to the Rel-16 routing configuration.

As another aspect of the controllability of the IAB donor, it needs to be counted that the IAB donor can recognize local rerouting and start/stop the local rerouting at the IAB node for coexistence of the local rerouting and topology-wide objectives. For example, the IAB donor may determine whether the topology-wide objectives are still achieved based on recognition of which IAB node is currently performing the local rerouting. When the IAB donor finds that the topology-wide objectives cannot be achieved, the IAB donor may instruct the IAB node to start/stop local rerouting, or the IAB donor may change the routing configuration for the entire IAB topology.

How to address the topology-wide objectives through the local rerouting depends on the implementation of the IAB donor, but the IAB donor may need information and controllability of the local determination of the IAB node.

Proposal 12: RAN2 needs to study whether the IAB node needs to notify the IAB donor when local rerouting is started/stopped.

Proposal 13: RAN2 needs to discuss whether the IAB donor can instruct the IAB node to start/stop local rerouting.

Other Enhancements

Enhancements of BH RLF Recovery and Cell (Re)selection

In an RRC reestablishment procedure, the IAB-MT first executes a cell selection procedure in order to find an appropriate cell. In the cell selection procedure, potential problems were pointed out in Rel-16, such as one that the IAB-MT may select its descendant node. Thus, this was discussed in email discussion.

As illustrated in FIG. 20, possible five solutions were discussed and summarized together with the rapporteur's view.

The conclusion was that "no further action is taken on this topic in Rel-16". This means that RAN2 agreed on "Option 4: Nothing needed since RRC reestablishment will fail if there is no BH connectivity". Option 4 requires waiting for a failure (expiry of T301) and finally going to an idle state and was thus acceptable in a Rel-16 deployment scenario even when further time is required for BH RLF recovery.

Finding 6: In Rel-16, when the IAB node attempts an RRC reestablishment request to the descendant node, the IAB node needs to wait for a failure of the attempt, and finally go to an idle state.

In Rel-17, from the viewpoint of Finding 6, cell (re) selection and RRC reestablishment may frequently occur. Thus, suboptimal operation, in other words, operation in accordance with Finding 4, shall cause significant deterioration in performance from the viewpoint of stability of the IAB topology and service continuity. Thus, in order to optimize the operation of the IAB-MT during BH RLF recovery, "the topic can be discussed again in Rel-17", as stated by the rapporteur of the above email discussion.

Proposal 14: RAN2 should agree to study optimization of cell (re)selection in order to avoid reestablishment to an inappropriate node (for example, a descendant node).

It may be assumed that a common concept in the solutions identified except for Option 4 above is that the IAB-MT is provided with a type of either a whitelist or a blacklist for the purpose of cell selection. For example, given that topology changes may frequently occur in Rel-17 due to "inter-donor IAB-node migration", the whitelist and the blacklist have advantages and disadvantages depending on the topology and the positions of the IAB nodes.

For example, from the viewpoint of an IAB node close to an IAB donor, in other words, the uppermost in DAG topology, because the number of candidate nodes is small, and in some cases only an IAB donor DU, providing the whitelist is more reasonable.

However, in another example as a viewpoint of an IAB node very distant from an IAB donor, in other words, the lowest in DAG topology, a great number of candidate nodes may need to be included in the whitelist. Instead, for example, a blacklist includes only downstream IAB nodes of the IAB node to be concerned and in some cases includes only a small number of child IAB nodes, and thus in this case, it has an advantage that overhead is small.

One matter of concern of the whitelist is that, due to the property of "inter-donor IAB-node migration" of Rel-17, candidate IAB nodes belonging to different/adjacent IAB topology may need to be included, which may result in increasing the size of the list. On the other hand, needless to say, downstream IAB nodes belong to the same IAB topology, and thus the blacklist need not consider the matter.

Finding 7: The whitelist and the blacklist have advantages and disadvantages depending on the topology and the positions of the IAB nodes.

Thus, when information is provided to the child IAB node for the purpose of cell selection, the IAB donor (or the parent IAB node) is desirable to be able to select either the whitelist or the blacklist. Note that the information may be useful if being reused for the purpose of cell reselection.

Proposal 15: RAN2 should agree to provide the whitelist or the blacklist (i.e., selection structure) to the IAB-MT for the purpose of cell selection in order to avoid reestablishment to a descendant node. Whether these lists can also be used for a cell reselection procedure requires further study.

When Proposal 15 can be agreed on, a method of providing the information, in other words, the whitelist or the blacklist, should be further studied. Option 1 assumes CHO configuration, and some enhancements may be required. Option 2 assumes additional Indications, for example, the BH RLF Indication of Type2 and the like. Option 3 assumes provision of information of the overall topology, which is not present in the existing configuration. Option 5 assumes OAM-based configuration; however, this is questionable as the rapporteur pointed out.

Considering again the assumption of Rel-17, in other words, the fact that the parent IAB node or the IAB donor should provide a list to the child IAB node when a topology change occurs, the method of providing the whitelist/blacklist should be a dynamic method. Thus, Option 5, in other words, OAM, should be excluded. Which method, in other words, which method out of Options 1, 2, and 3, is to be used as the baseline for the enhancements requires further study.

Proposal 16: RAN2 should agree that the parent IAB node or the IAB donor dynamically provides the whitelist/blacklist each time the topology is changed. The details thereof require further study.

Enhancements of Lossless Delivery

In the stage of research of Rel-15, the problem of multi-hop RLC ARQ was discussed and captured in Section 8.2.3 of TR. In Rel-16, the protocol stack was defined for the IAB including unsplit RLC layers. In other words, in Rel-16, end-to-end ARQ was excluded, and hop-by-hop ARQ was adopted.

Regarding the hop-by-hop ARQ, the problem in end-to-end reliability, in other words, lossless delivery with UL packets, was identified. As illustrated in FIG. 21, three solutions were identified and evaluated.

In Rel-16, "Modification of PDCP protocol/procedures" being a first solution was not adopted because it would affect a Rel-15 UE.

"Rerouting of PDCP PDUs buffered on intermediate IAB-nodes" being a second solution was supported as implementation selection in the BAP layer. The BAP layer may implement the second solution on the assumption that "data buffering in a transmission part of a BAP entity until an RLC-AM entity receives an acknowledgment response is implementation dependent, for example". These BAP implementations were considered in order to avoid packet loss in "most" of the cases of the Rel-16 deployment scenario, in other words, the cases where stationary IAB nodes are used. However, the implementations were not perfect as illustrated in FIG. 20, for example.

"Introducing UL status delivery" being a third solution was a promised solution for guaranteeing lossless delivery of UL data, with evaluation results cited in FIG. 20 taken into consideration. The idea was to delay the RLC ARQ to the UE, so that PDCP data recovery at the UE is initiated when necessary. However, this was not defined in Rel-16 because it had been assumed that UL packets would be rarely dropped due to topology change as the stationary IAB node was assumed.

Considering the assumption of Rel-17, it is no longer rare that UL packets are lost during the topology change, which occurs frequently in Rel-17, and thus the third solution should be further studied. Thus, RAN2 should discuss an enhancement mechanism for guaranteeing lossless delivery in an L2 multi-hop network, in addition to the results captured in TR.

Proposal 17: RAN2 should agree to introduce a solution identified in TR 38.874, in other words, a mechanism to guarantee lossless delivery under a condition that the topology change possibly frequently occur based on some form of "UL status delivery".

For the details of the third solution, in other words, "Introducing UL status delivery", two options, namely C-1 and C-2, were discussed via email as illustrated in FIG. 22.

Regarding C-1 above, it is assumed that a "confirmation" from the IAB donor needs to be defined in the BAP or the RRC for end-to-end signaling transfer via the multi-hop L2 network. Thus, in order to define the option, a relatively high standard effort shall be required.

Regarding C-2 above, when C-2 fully functions in the IAB topology and the RLC ACK is to be transmitted to the UE (or the downstream IAB node) even if it needs to be assumed that OAM configures all of the IAB nodes with the use of the option, it finally depends on IAB-DU implementation, and thus C-2 can be actually implemented for a Rel-16 IAB node as well. Because hop-by-hop feedback is assumed and no additional Control PDUs are assumed, C-2 is easier to implement than C-1. Thus, C-2 should be the baseline for the enhancements of Rel-17 for lossless delivery of the UL packets.

Finding 8: C-2 being a solution of "Introducing UL status delivery" may be the baseline for the enhancements of Rel-17, and this can be implemented for Rel-16 as well.

Note that, because Rel-17 should assume dynamic topology change that causes UL packet loss, the enhancements of Rel-17 shall support C-2 as a standard support function. At least in the specification of stage 2, an overall mechanism based on C-2 should be described. Otherwise, in the 3GPP standard, lossless delivery is not guaranteed during the handover of the IAB node. In stage 3, although minor changes such as those of the RLC and/or the BAP are assumed, these are regarded as internal operations of the IAB node, and thus details thereof may not be defined.

Proposal 18: RAN2 should agree to define an RLC ARQ mechanism for lossless delivery of UL packets in stage 2. This delays transmission of the ACK to the child node/UE before the ACK is received from the parent IAB node (i.e., C-2). Whether to define this in stage 3/how to define this require further study.

The invention claimed is:

1. A communication control method used in a cellular communication system, the communication control method comprising:

receiving, by a relay node, a recovery attempt notification from a first parent node of the relay node, the recovery attempt notification indicating that the first parent node is attempting to recover from a failure, the failure having occurred in a backhaul link between the first parent node and a node that is a further parent node of the first parent node; and forwarding, by the relay node in response to reception of the recovery attempt notification, a first packet received from the first parent node to a child node of the relay node and a second packet received from the child node to a second parent node that is a parent node of the relay node.

2. The communication control method according to claim 1, further comprising receiving, by the relay node, a recovery notification from the first parent node, the recovery notification indicating that the failure has been recovered, wherein the forwarding comprises forwarding, by the relay node, a third packet to the first parent node without forwarding the third packet to the second parent node.

3. A communication control method used in a cellular communication system, the communication control method comprising:

receiving, by a relay node, a recovery attempt notification from a first parent node, the recovery attempt notification indicating that the first parent node is attempting to recover from a failure, the failure having occurred in a backhaul link between a parent node of the relay node and a node that is a further parent node of the parent node; and broadcasting, by the relay node having received the recovery attempt notification, system information excluding Integrated Access and Backhaul (IAB) support when no alternative path to a donor node is present, wherein the IAB support is an information element indicating that a cell of the relay node supports IAB and that the cell is a cell to be considered as a cell selection for an IAB node.

4. The communication control method according to claim 3, further comprising broadcasting, by the relay node, the system information comprising the IAB support when an alternative path to the donor node is present.

5. The communication control method according to claim 3, further comprising:

receiving, by the relay node, a recovery notification from the parent node, the recovery notification indicating that the failure has been recovered; and broadcasting, by the relay node in response to reception of the recovery notification, the system information comprising the IAB support.

6. A communication control method used in a cellular communication system, the communication control method comprising:

receiving, by a relay node, a configuration of not performing a predetermined transmission or of performing the predetermined transmission a predetermined number of times of transmission or less when the relay node receives a recovery attempt notification from a parent node of the relay node, the recovery attempt notification indicating that the parent node is attempting to recover from a failure, the failure having occurred in a backhaul link between the parent node and a node that is a further parent node of the parent node; and, by the relay node in response to reception of the recovery attempt notification and in accordance with the configuration, not performing the predetermined transmission or performing the predetermined transmission the predetermined number of times of transmission or less, wherein the predetermined transmission is a transmission, to the parent node, of a scheduling request, a buffer status report and/or an Uplink (UL) packet.

7. The communication control method according to claim 6, further comprising receiving, by the relay node, a recovery notification from the parent node, the recovery notification indicating that the failure has been recovered, wherein the performing the predetermined transmission comprises performing, by the relay node in response to reception of the recovery notification, the predetermined transmission without reducing the number of times of transmission.

8. The communication control method according to claim 6, wherein the receiving the configuration comprises receiving, by the relay node, a configuration of a prohibit timer value, and wherein the performing the predetermined transmission comprises performing, by the relay node, the predetermined transmission the predetermined number of times of transmission or less by not performing the predetermined transmission until the prohibit timer value expires and performing the predetermined transmission when the prohibit timer value expires.

9. The communication control method according to claim 6, wherein the receiving the configuration comprises receiving, by the relay node, a configuration of a counter value, and wherein the performing the predetermined transmission comprises performing, by the relay node, the predetermined transmission the predetermined number of times of transmission or less by not performing the predetermined transmission until a transmission opportunity for the predetermined transmission reaches the counter value and performing the predetermined transmission when the transmission opportunity reaches the counter value.

10. The communication control method according to claim 6, further comprising not performing, by the parent node in response to reception of the scheduling request and/or the buffer status report from the relay node the predetermined number of times of transmission or less, transmission of a UL grant to the relay node.

11. The communication control method according to claim 6, further comprising performing, by a donor node or the parent node, the configuration.

* * * * *